US012454281B2

(12) United States Patent
Jarquin Arroyo et al.

(10) Patent No.: US 12,454,281 B2
(45) Date of Patent: Oct. 28, 2025

(54) SYSTEMS AND METHODS FOR CROSS-DOMAIN TRAINING OF SENSING-SYSTEM-MODEL INSTANCES

(71) Applicant: Intel Corporation, Santa Clara, CA (US)

(72) Inventors: Julio Fernando Jarquin Arroyo, Baden-Wuerttemberg (DE); Ignacio Javier Alvarez Martinez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 767 days.

(21) Appl. No.: 17/559,665

(22) Filed: Dec. 22, 2021

(65) Prior Publication Data

US 2022/0111864 A1 Apr. 14, 2022

(51) Int. Cl.
B60W 60/00 (2020.01)
G06F 18/214 (2023.01)
G06N 20/00 (2019.01)

(52) U.S. Cl.
CPC ....... *B60W 60/001* (2020.02); *G06F 18/2155* (2023.01); *G06N 20/00* (2019.01)

(58) Field of Classification Search
None
See application file for complete search history.

(56) References Cited

U.S. PATENT DOCUMENTS

| 2019/0303487 | A1* | 10/2019 | Mehta | G06F 16/254 |
| 2019/0386889 | A1* | 12/2019 | Noorshams | H04L 47/83 |
| 2020/0410394 | A1* | 12/2020 | Zhang | G06F 16/9024 |

OTHER PUBLICATIONS

Gaur, Eshan, et al., "Video annotation tools A Review", International Conference on Advances in Computing, Communication Control and Networking (ICACCCN) (pp. 911-914). IEEE., 2018, 4 pages.*

Weng, Zhenzhen, et al. "Utilizing Weak Supervision to Infer Complex Objects and Situations in Autonomous Driving Data", 2019 IEEE Intelligent Vehicles Symposium (IV) Paris, France. Jun. 9-12, 2019, 7 pages.*

(Continued)

*Primary Examiner* — Darryl V Dottin
(74) *Attorney, Agent, or Firm* — Schwegman Lundberg & Woessner, P.A.

(57) ABSTRACT

Disclosed herein are systems and methods for cross-domain training of sensing-system-model instances. In an embodiment, a system receives, via a first application programming interface (API), an input-dataset selection identifying an input dataset, which includes a plurality of dataframes that are in a first dataframe format and that have annotations corresponding to one or more sensing tasks performed with respect to the dataframes. The system executes a plurality of dataframe-transformation functions to convert the plurality of dataframes of the input dataset into a predetermined dataframe format. The system trains an instance of a first machine-learning model using the converted dataframes of the input dataset to perform at least a subset of the one or more sensing tasks. The system outputs, via the first API, one or more model-validation metrics pertaining to the training of the instance of the first machine-learning model.

25 Claims, 12 Drawing Sheets

(56) References Cited

OTHER PUBLICATIONS

Gaur, Eshan, et al., "Video annotation tools A Review", International Conference on Advances in Computing, Communication Control and Networking (ICACCCN) (pp. 911-914). IEEE., (Oct. 12, 2018), 4 pages.

Weng, Zhenzhen, et al., "Utilizing Weak Supervision to Infer Complex Objects and Situations in Autonomous Driving Data", 2019 IEEE Intelligent Vehicles Symposium (IV) Paris, France. Jun. 9-12, 2019, (Jun. 9, 2019), 7 pages.

* cited by examiner

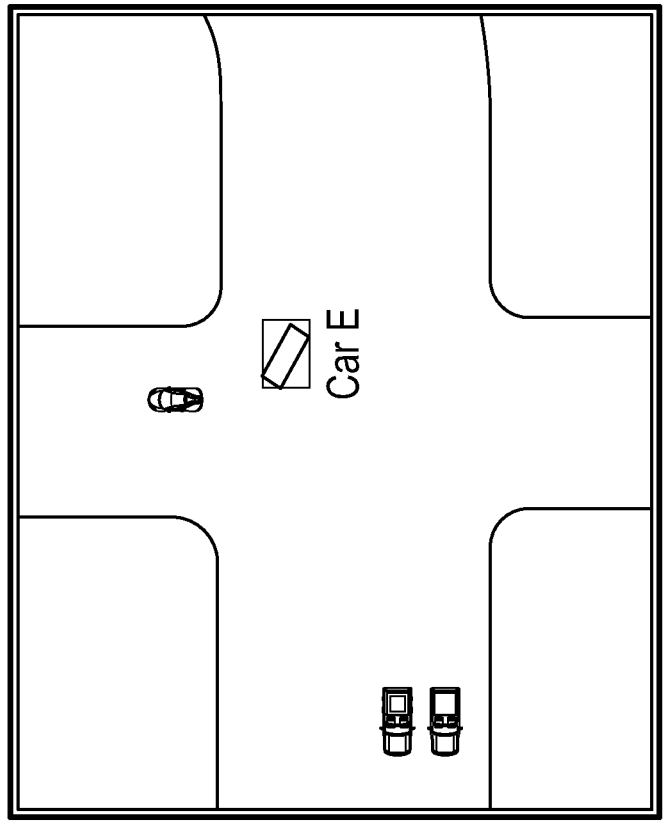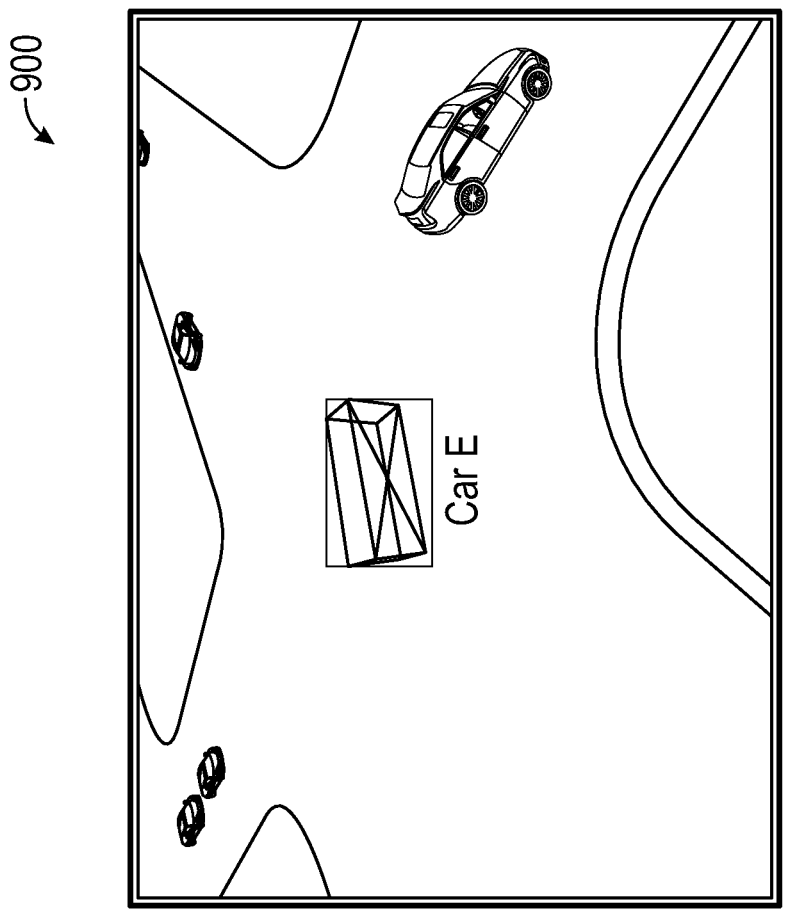
FIG. 9

SYSTEMS AND METHODS FOR CROSS-DOMAIN TRAINING OF SENSING-SYSTEM-MODEL INSTANCES

TECHNICAL FIELD

Among other technical fields, embodiments of the present disclosure pertain to robots, assisted-driving vehicles, autonomous-driving vehicles, data structures, dataset schema, dataset content, machine learning and, more particularly, to systems and methods for cross-domain training of sensing-system-model instances.

BACKGROUND

The development, training, and use of robots is becoming more and more common every day. Two example contexts is which robots are becoming increasingly capable, important, and sophisticated are assisted-driving vehicles and autonomous-driving vehicles. Moreover, robots are also developed, trained, and deployed in numerous other contexts (e.g., warehousing, logistics, medicine, etc.). It is typically a goal in the training of machine-learning-model instances for robots to use training data, test data, and the like that will adequately prepare the trained robot (including the trained model instance or model instances executing on the trained robot) for actual input data (e.g., sensor data) that the robots encounter in operation (e.g., once deployed). This includes but is not limited to the context of sensing-system model instances for robots and other autonomous agents.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 9 depicts a third example visualization output, in accordance with at least one embodiment.

DETAILED DESCRIPTION

Figure 1:
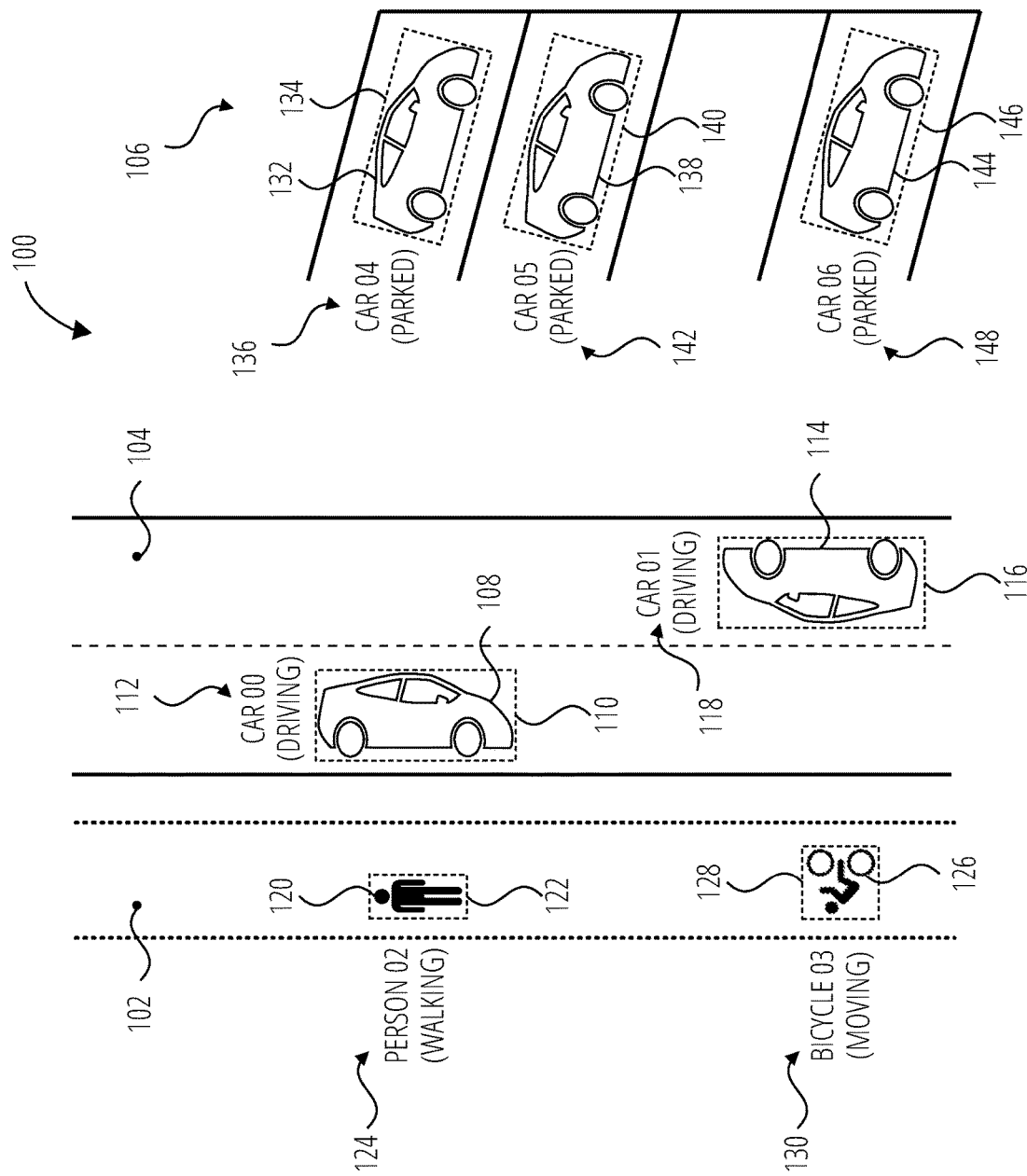
FIG. 1 depicts an example geographic snapshot, in accordance with at least one embodiment.

As a general matter, as alluded to above, it is desirable that robots (e.g., autonomous vehicles) are trained in such a way as to be able to function properly across a wide variety of domains of input data. Such input-data domains can be defined as being or including particular training-and-test data sets, and can also or instead be defined as data pertaining to one or more particular geographic areas, particular sets of tasks (e.g., properly navigating traffic lights, properly recognizing and safeguarding pedestrians, and/or the like), particular types of onboard sensors, particular configurations of onboard sensors, one or more ambient conditions (e.g., levels of road slickness, precipitation, temperature, etc.), and/or the like. With respect to particular tasks, in some implementations, each task is handled by a different respective model instance.

In the present disclosure, autonomous vehicles are the type of robots that are used to illustrate most of the herein-described examples. These vehicles are sometimes also referred to as "automated vehicles," "self-driving cars" (in the cases of the vehicles being cars, of course), and/or the like. As stated above, embodiments of the present disclosure can be implemented in connection with assisted-driving vehicles as well as numerous other types of robots, as deemed suitable by those of skill in the art in a given context.

Autonomous vehicles typically include a number of inter-working components, one of which is known as a "sensing system." The sensing system (which also may be referred to at times as a "perception system") may include (or at least have access to) a plurality of sensors for sensing the ambient environment of the vehicle. These sensors may include cameras, radar devices, lidar devices, gyroscopes, accelerometers, and/or the like. In addition to sensors, many sensing systems also include a trained instance of a machine-learning model (referred to herein at times as an instance of a "sensing model") for processing sensor data received from the sensor array of the sensing system. A sensing system may at times be referred to as a "sensor subsystem" of an autonomous vehicle. Moreover, autonomous vehicles are often referred to as having what is known in the industry as an automated driving system (ADS) to control autonomous-driving operations, where the sensing system would be one functional component or subsystem of the ADS.

As a general matter, it is desirable that a given sensing-model instance (and, more broadly, a given sensing system) of a given autonomous vehicle provide the control system of the vehicle with an accurate and robust representation of the current environment in which the autonomous vehicle is operating. Better data makes for better decisions. In many current implementations, the development process for a given sensing system of an ADS of an autonomous vehicle makes use of datasets captured from real-world environments with multiple sensors. These datasets are often annotated with what are referred to as "ground-truth labels" to aid in evaluating the accuracy of the sensing tasks. In some cases, labels across multiple datasets are not compatible or sufficient for evaluation of a given performance test. This results in many sensing-model instances being trained independently on different datasets, typically causing the resulting sensing system to underperform in operation (i.e., "in the wild"). As a general matter, existing tools that are available in current implementations are too segmented and narrowly applicable, which limits their usefulness in the context of attempting to train a given sensing-model instance across a variety of domains.

As used in the present disclosure, two datasets may be considered to be in (or "representative of," etc.) different domains based on differing from one another in one or more of the following dataset dimensions: geolocation of data collection, times and days of data collection, onboard sensor configuration, onboard sensor types, label names in the dataset, tasks on which a given autonomous vehicle is being evaluated, and/or the like. The described inconsistency across datasets results in complex challenges for assessing safety performance under a growing number of operational design domains (ODDs), which benefit from multiple dataset collections in different environmental conditions, locations, and/or the like.

The underperformance of trained sensing-model instances due to, among other causes, inconsistencies across datasets is an example of what is often referred to more generally as a "domain transfer issue." As alluded to above, "domain," "input domain," "design domain," "ODD," and the like are terms that themselves are not used perfectly consistently across the industry. The term "domain gap" is also relevant in this context, and generally refers to a phenomenon where a given trained model instance performs quite well on its own training data and then not so well in real "in-the-wild" situations. The domain gap is a reference to the difference between high performance in a controlled environment and poor performance in an uncontrolled environment.

Some prior implementations offer capabilities such as video-data annotation, automatic labeling, labeling modifications, labeling corrections, and the like. Other prior approaches involve proposals to use programming methods to automatically capture heuristics of data labels and apply them to a large dataset. Such tools offer users the capabilities of, as examples, creating and modifying data labels, and some tools provide capabilities such as automatic labeling of adjacent frames. Prior implementations do not, however, support the type of labeling and transformations necessary for automated-driving datasets, which is a context in which data of the same or different types often requires transformations of ground-truth labels in two dimensions (2D) or in three dimensions (3D).

Among other functions, embodiments of the present disclosure manage automatic calibration and transformations that are useful for multimodal datasets in the fields of, e.g., automated driving, robotics, and the like. Moreover, it is often that case that, with respect to prior implementations that involve automatic-labeling tools, even if labeling heuristics can be learned programmatically, such heuristics are only valid for a single point of view, and don't have 3D information or transformation capabilities such as those described herein in connection with embodiments of the present disclosure.

To address these and other shortcomings of prior implementations, disclosed herein are embodiments of systems and methods for facilitating cross-domain training of sensing-system-model instances. Embodiments of the present disclosure reduce the domain transfer issue across automated-driving datasets at least in part by facilitating the import of multimodal datasets into a model-instance-and-dataset-evaluation system. In various embodiments, such a system may provide a suite of capabilities such as but not limited to multimodal data loading, sensor-input calibration, visualization, label harmonization, label customization, and the like.

Among the functions of embodiments of the present disclosure is preparing automated-driving datasets for use in the process of training instances of sensing models for sensing systems of, e.g., autonomous vehicles. As described, having well-trained, robust sensing model instances equips an autonomous vehicle to make decisions based on accurate and robust information about the environment in which it is currently operating. In some embodiments, a goal is to facilitate the sensing system of an autonomous vehicle achieving at least a threshold level of operational performance across multiple domains. This may be referred to herein as "cross-domain training" of instances of sensing models.

Among other benefits, embodiments of the present disclosure expedite the developer effort of training and evaluating sensing model instances for automated driving across multiple automated-driving datasets by facilitating ingestion, data preparation, and labeling across automated-driving datasets. Embodiments of the present disclosure offer a useful set of application programming interfaces (APIs) for developers to explore new automated-driving datasets, and facilitate the data preparation and training of model instances as well as the evaluation of results, comparing performance across automated-driving datasets and thus reducing the "domain transfer issue."

One embodiment takes the form of a system that includes at least one hardware processor and that also includes at least one memory storing instructions that, when executed by the at least one hardware processor, cause the at least one hardware processor to perform a set of functions including those described in this paragraph. The system receives, via a first API, an input-dataset selection identifying an input dataset. The input dataset includes a plurality of dataframes that are in a first dataframe format and that have annotations corresponding to one or more sensing tasks performed with respect to the dataframes. The system executes a plurality of dataframe-transformation functions to convert the plurality of dataframes of the input dataset into a predetermined dataframe format. The system trains an instance of a first machine-learning model using the converted dataframes of the input dataset to perform at least a subset of the one or more sensing tasks. The system outputs, via the first API, one or more model-validation metrics pertaining to the training of the instance of the first machine-learning model.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

FIG. 1 depicts an example geographic snapshot 100, in accordance with at least one embodiment. In particular, the geographic snapshot 100 depicts a moment in time in a given geographic area, and further depicts a number of entities (a person, a bicycle, a number of cars, and so on) that have been detected and had ground-truth labels associated with them by a trained instance of a machine-learning model. Identifying objects using, e.g., machine learning and applying labels to the identified objects is known to those of skill in the art. Indeed, multiple tools have been developed for data annotation in connection with machine learning. Some video-data-annotation tools provide capabilities such as automatic labeling, label modifications, label corrections, and the like.

As can be seen in FIG. 1, there is a walkway 102 on which a person 120 has been identified. The person 120 is shown as being within a bounding box 122, and a label that reads "person 02 (walking)" has been applied. Moreover, also on the walkway 102, identification and labeling has been made of a bicyclist operating a vehicle 126, which in this case is a bicycle. The vehicle 126 is within a bounding box 128 and is accompanied by a label 130 that reads "bicycle 03 (moving)." As can be seen by this label and the label 124 as illustrative examples, each label in this example includes not only a name for what has been identified, but also includes an indication of a current activity (or state) of the identified entity at the time of the geographic snapshot 100.

Moreover, also in the geographic snapshot 100, a street 104 includes a vehicle 108 (car) inside a bounding box 110 and accompanied by a label 112 that reads "car 00 (driving)." Similarly, a vehicle 114 is shown in a bounding box 116 with an accompanying label 118 that reads "car 01 (driving)." The geographic snapshot 100 also includes a parking area 106 that includes four depicted parking spots. A vehicle 132 (car) is depicted in a bounding box 134 and having a label 136 that reads "car 04 (parked)." Furthermore, a vehicle 138 (car) is depicted in a bounding box 140 and having a label 142 that reads "car 05 (parked)." Finally, a vehicle 144 (car) is depicted in a bounding box 146 and having a label 148 that reads "car 06 (parked)." The arrangement shown in FIG. 1 is provided by way of example to illustrate the type of output that a machine-learning-model instance may provide during training and operation. In this case, the output is to annotate the image with the aforementioned bounding boxes and alphanumeric labels.

Figure 2:
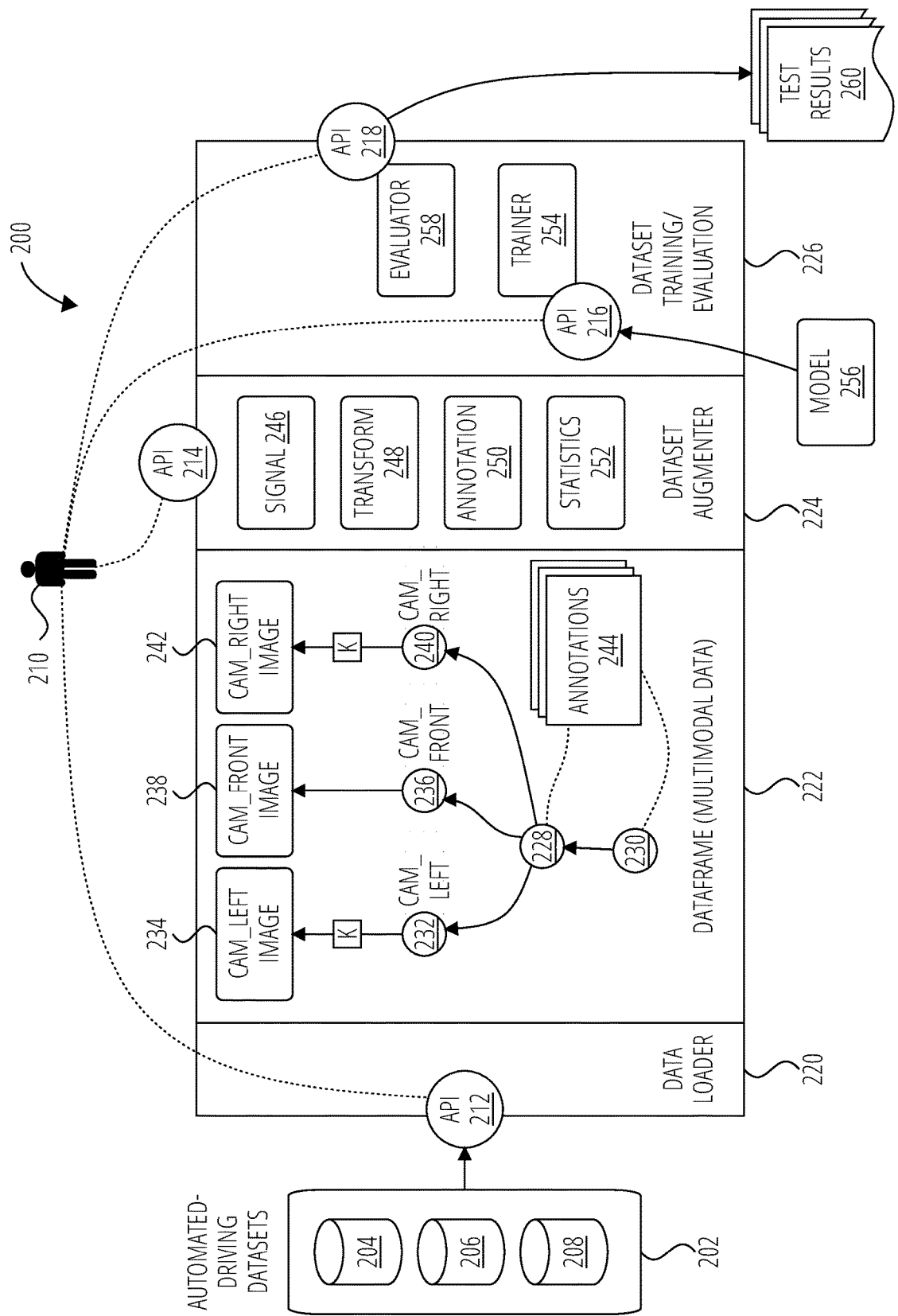
FIG. 2 depicts an example system framework, in accordance with at least one embodiment.

FIG. 2 depicts an example model-instance-and-dataset-evaluation system 200, in accordance with at least one embodiment. Depicted on the left side of FIG. 2 is a set of automated-driving datasets 202 including, as examples a dataset 204, a dataset 206, and a dataset 208. Any number of automated driving datasets could be utilized in connection with a given embodiment. Moreover, in at least one embodiment, the depicted model-instance-and-dataset-evaluation system 200 processes one automated-driving dataset 202 at a time, and a plurality of automated-driving datasets 202 are depicted in FIG. 2 as an illustration of the cross-domain capabilities of the model-instance-and-dataset-evaluation system 200.

The example model-instance-and-dataset-evaluation system 200 is depicted as including a data loader 220, a dataset augmenter 224, and a dataset-training-and-evaluation subsystem 226. Moreover, a dataframe 222 is depicted in between the data loader 220 and the dataset augmenter 224. Embodiments of the present disclosure include a plurality of APIs that provide a user with a number of different types of functionality. Four such APIs are shown in the embodiment that is depicted in FIG. 2: a data-ingestion API 212, a data-augmentation API 214, a model-instance-training API 216, and a model-instance-evaluation API 218. One or more different APIs could be provided in addition to or instead of one or more of the APIs that are depicted in FIG. 2. The various functions and interactions available via these respective APIs are further described below.

The example depicted in FIG. 2 further includes a sensing-model instance 256 that is labeled "model under test." The sensing-model instance 256 represents a particular instance of a particular type of machine-learning model that the user 210 may be currently evaluating. Also depicted in FIG. 2 and discussed more fully below are a set of test results 260. As described throughout the present disclosure, various embodiments aid developers of machine-learning model for sensing systems by enabling those developers to readily evaluate various sensing models across multiple different automated-driving datasets. Thus, making use of embodiments of the present disclosure speeds up the development process of sensing models across disparate datasets.

In various embodiments, a user 210 may interact with the system via any suitable user interface (e.g., graphical, text-based, command-line, and/or the like). In the embodiments that are primarily described in the present disclosure, the user 210 interacts with the model-instance-and-dataset-evaluation system 200 using command-line instructions, as described more fully below. In different embodiments, the user 210 may make choices with respect to type of machine-learning model (including parameters such as number of layers and the like), and may select a given one of the automated-driving datasets automated-driving dataset 202 for processing. Furthermore, as is also described below, the user 210 may use the model-instance-and-dataset-evaluation system 200 to explore datasets, map labels in datasets to a common representation of an automated-driving dataset that is provided by various embodiments. Further functions available via the model-instance-and-dataset-evaluation system 200 are further discussed throughout the present disclosure.

A number of categories of functions provided by the model-instance-and-dataset-evaluation system 200 are described below, the first of which is dataset loading and exploration. In accordance with at least one embodiment, if the user 210 wishes to load and explore a new automated-driving dataset (called "exampleDataset" in the present disclosure), the model-instance-and-dataset-evaluation system 200, upon request from the user, can load exampleDataset into the system as an instance of a programming object class that is called "MultiModalDataset" in the present disclosure.

In various embodiments, the MultiModalDataset class handles the storing of the raw sensor data, annotations, and additional metadata such as the available modalities and sensors. In an embodiment, that additional metadata is stored in a class called "MultiModalInfo" in the present disclosure. In an embodiment, the model-instance-and-dataset-evaluation system 200 uses what is referred to herein as a DataFrame object to hold the sensor data, calibration, and annotations for a specific time instance. Once a DataFrame is created, the raw sensor data can be copied to the DataFrame, which imports the data to the MultiModalDataset for manipulation. In an embodiment, an interactive Python shell is used for the command-line interactions described below. Furthermore, in this disclosure, a ">>" prompt is used to signify the beginning of each new command line for receiving input. The following example input and example output may correspond to the loading of exampleDataset into the model-instance-and-dataset-evaluation system 200. The user 210 may utilize the data-ingestion API 212 for these functions.

Example Input

```
>>from system.datasets import MultiModalDataset
>>dataset=MultiModalDataset('/localdisk/datasets/ex-
    ampleDataset')
>>dataset
```

Example Output

MultiModalDataset(Total Frames=100, Modalities=['LIDAR', 'CAM'], Channels=['LIDAR_01', 'LIDAR_02', 'CAM_01', 'CAM_02', 'CAM_03', 'CAM_04', 'CAM_05', 'CAM_06', 'CAM_TOP'])

As can be seen from the command-line output above, the model-instance-and-dataset-evaluation system 200 has identified that exampleDataset includes 100 total frames, includes lidar sensors and cameras as the two modalities represented in the raw data, and further includes a total of nine data channels, two for lidar sensors named 'LIDAR_01' and 'LIDAR_02', and seven for cameras named 'CAM_01', 'CAM_02', 'CAM_03', 'CAM_04', 'CAM_05', 'CAM_06', and 'TOP CAM'.

Furthermore, the user 210 can use the dataset class methods to explore the content of exampleDataset. The example input and example output below correspond to use in a Python shell of the method get_frame(x) which receives the frameID as parameter x.

Example Input

```
>>data_frame=dataset.get_frame(0)
>>data_frame
```

Example Output

DataFrame([timestamp=1970-01-01 00:00:00, Channels=['LIDAR_01', 'LIDAR_02', 'CAM_01' 'CAM_02' 'CAM_03' 'CAM_04', 'CAM_05' 'CAM_06', 'CAM_ TOP'], Annotations=168, Config={'create_mode': False}) with Metadata: { }

It can be seen from the above output that DataFrame(0) includes a timestamp, the above-described nine data channels, and 168 annotations. Some configuration and metadata information is also provided in the example output. In various embodiments, information that can be retrieved via the DataFrame object includes examples such as which modalities are available at a particular frame, channel path, channel data, annotations, and transform trees, which are discussed more fully below.

Figure 6:
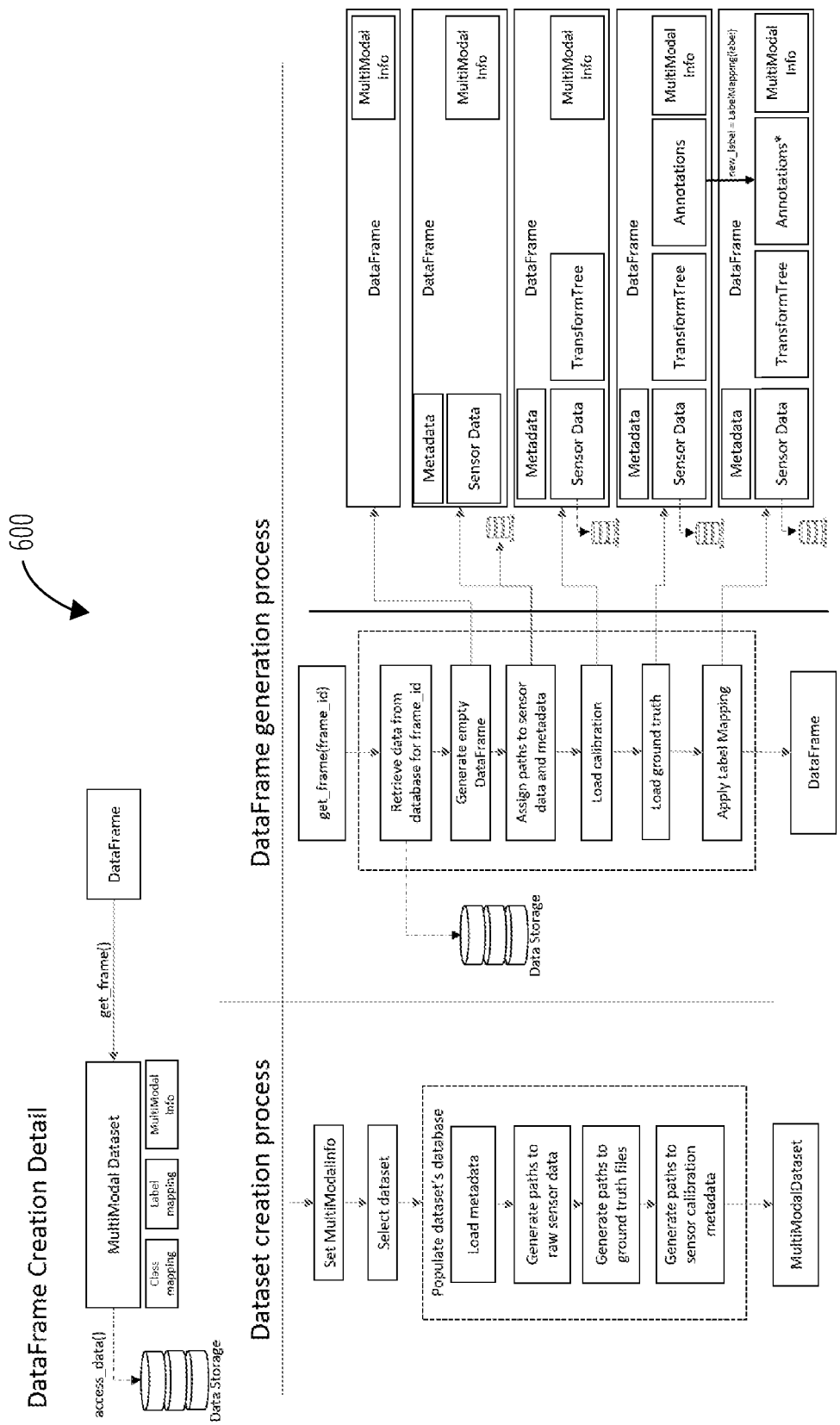
FIG. 6 depicts an example information-flow diagram, in accordance with at least one embodiment.

Additional detail is provided in FIG. 6, which depicts an example information-flow diagram 600. In particular, FIG. 6 includes three separate diagrams for two separate processes: dataset creation and DataFrame creation/generation. The lower-left diagram in FIG. 6 shows that, in at least one embodiment, a dataset-creation process includes steps to set the metadata object (MultiModalInfo) and select the dataset, and then a four-step process to populate a database for the selected dataset. Those four steps are to load the metadata, generate paths to the raw sensor data, generate paths to ground-truth files, and generate paths to sensor-calibration metadata. The result is the exampleDataset having been loaded into a class of type MultiModalDataset.

Additionally, FIG. 6 provides two illustrations of a creation (generation) process of a DataFrame. This description focuses on the bottom-right flowchart, which provides more detail than does the top-most flowchart. It can be seen that DataFrame generation involves the following functions: (i) a call of the get_frame method with a specified frameID; (ii) retrieving, from data storage, data associated with the provided frameID; (iii) generating an empty DataFrame (shown to the right as including only a MultiModalInfo class; (iv) assigning paths to sensor data and metadata; (v) loading calibration data; (vi) loading ground-truth data; and (vii) applying label mapping. The end result is a generated DataFrame. The progression as the DataFrame is populated step by step is shown in the righthand column.

Figure 5:
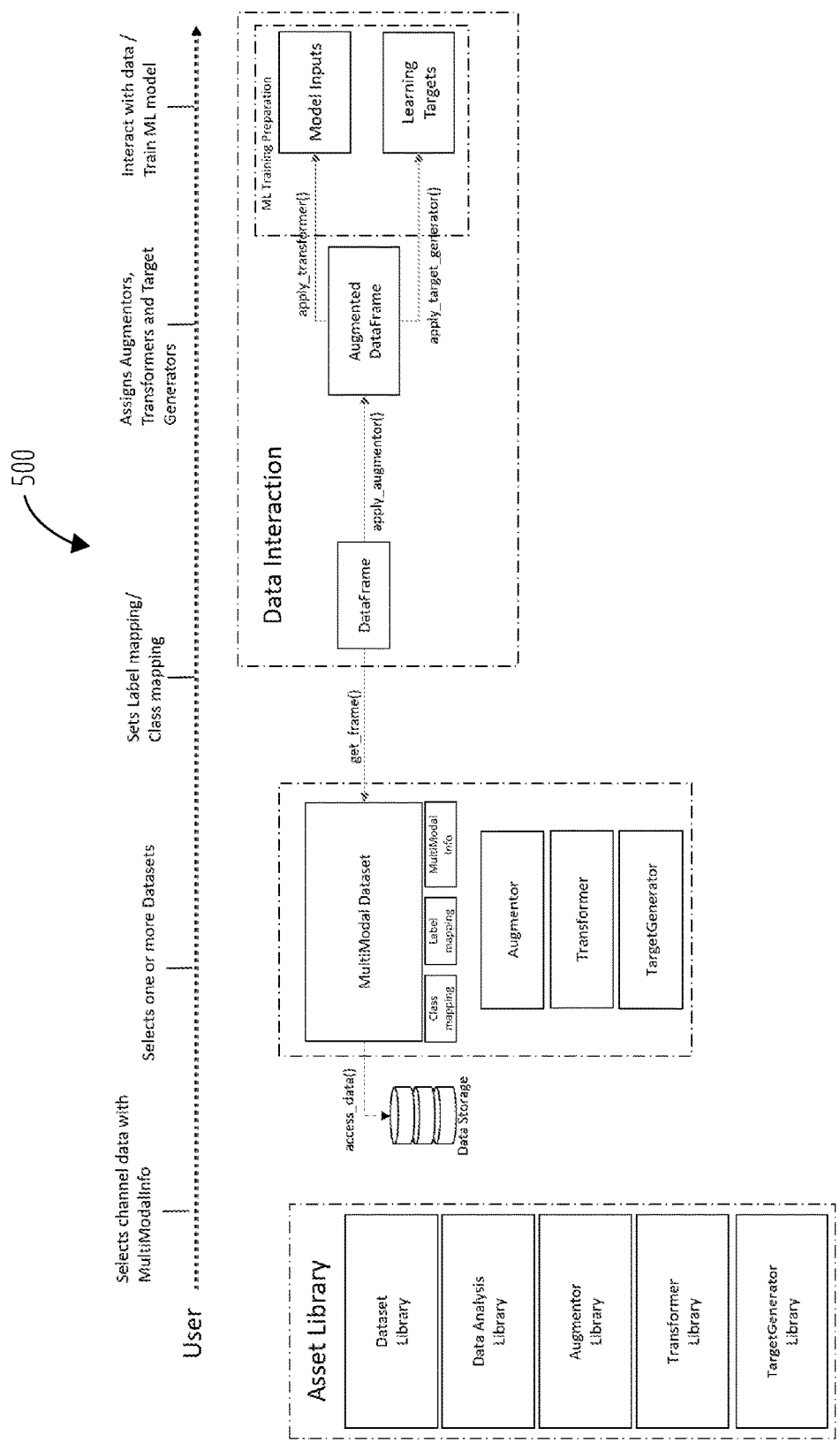
FIG. 5 depicts an example information-architecture diagram, in accordance with at least one embodiment.

Furthermore, in accordance with an embodiment, an overview of received user commands, information resources, and information flow is provided in FIG. 5, which depicts an example information-architecture diagram 500. As can be seen from left to right across the timeline at the top of the information-architecture diagram 500, the model-instance-and-dataset-evaluation system 200 receives, via the various APIs described herein, (i) a selection of channel data using the MultiModalInfo class; (ii) a selection of one or more automated-driving datasets; (iii) commands related to label mapping (discussed more fully below) and class mapping; (iv) assignments of data augmenters, data transformers, and target generators as discussed herein; and (v) user interactions with the exampleDataset, using the exampleDataset to train an instance of a machine-learning model.

As shown on the left side of the information-architecture diagram 500, in at least one embodiment, the user 210 has access to an asset library that facilitates selection of already supported datasets, augmenters, transformers, and target generators. Moreover, in an embodiment, dataset-analysis functionality is also included in the asset library. As described at various points in the present disclosure, in accordance with various embodiments, a user may select the particular data channels with which the user is choosing to work. In an example, the user may select a front camera and a topside lidar sensor. Those selections are stored by the model-instance-and-dataset-evaluation system 200 in an instance of the aforementioned MultiModal Info class. Next, a user may select a dataset (e.g., exampleDataset) along with a specification of the data-channel-selection information stored in the MultiModalInfo instance as discussed. This indicates to the model-instance-and-dataset-evaluation system 200 which data channels to load from which dataset.

Following creation of the instance of the MultiModalDataset class as previously discussed, the user then has options that include exploring the selected channels of the selected dataset, applying label-mapping changes as discussed below, augmenting the data as discussed herein, and further executing functions related to transforms and generation of targets. The particular values selected by a given user may depend on the machine-learning model that the user may be evaluating, developing, and/or the like. The user may also use the get_frame( ) function to access a specific data sample.

As a brief aside, it is noted that the empty parentheses (i.e., "( )") at the end of the name of the just-introduced get_frame( ) function is used in this disclosure to designate the preceding text as being a function name, and in no way implies that the particular function takes zero arguments (i.e., inputs). Certainly zero-argument functions exist and could be used in connection with embodiments of the present disclosure, but the "( )" notation in this description is unrelated to the number of arguments a given function may take.

Returning to FIG. 2, it can be seen that the dataframe 222 that is depicted there has a simpler structure than the 9-data-channel structure described in the previous (and subsequent) examples. In particular, the dataframe 222 includes a vehicle node 228, a world node 230, a left-camera node 232 that corresponds to a left-camera image 234, a front-camera node 236 that corresponds to a front-camera image 238, a right-camera node 240 that corresponds to a right-camera image 242, and a set of annotation 244. In at least one embodiment, each of the annotations 244 corresponds to a nearby vehicle and its associated label. The depicted elements of the dataframe 222 are provided by way of example, as innumerable other arrangements of such elements could be used in different implementations.

With respect to the data-augmentation API 214, the user 210 may use that API to augment the loaded dataset using the functional subparts of the dataset augmenter 224. In the depicted embodiment, those functional subparts include a signal augmenter 246, a transform augmenter 248, an annotation augmenter 250, and a statistics augmenter 252. In connection with various embodiments, these various augmenter subparts of the dataset augmenter 224 can be used by the user 210 to augment the loaded data in at least the ways described in the present disclosure.

It is noted with respect to the data-ingestion API 212, the data-augmentation API 214, the model-instance-training API 216, and the model-instance-evaluation API 218, and/or any one or more other APIs that may be included in a given implementation, it is not necessarily the case that the user 210 would be aware of which API they were interacting with at any given time. Certainly the APIs could be visually organized on a user interface such that each API is associated with a different window, screen region, command-line prompt, and/or the like. However, it is also possible that the model-instance-and-dataset-evaluation system 200 manages which API to use in a given situation based on a current state of the user's session, the particular command-line instructions just entered, and/or the like.

The fourth of the four depicted subcomponents of the model-instance-and-dataset-evaluation system 200 is the dataset-training-and-evaluation subsystem 226. As shown, the user 210 may utilize the model-instance-training API 216 to interact with a model-instance trainer 254, and may use the model-instance-evaluation API 218 to interact with a model-instance evaluator 258 to produce test results 260. The test results 260 could take any suitable form, including numerical output, statistical-test results, line graphs, bar graphs, other graphs, and/or the like. Those of skill in the art can certainly choose what type of machine-learning-model-instance metrics they would like to see during model development, evaluation, and the like.

Figure 4:
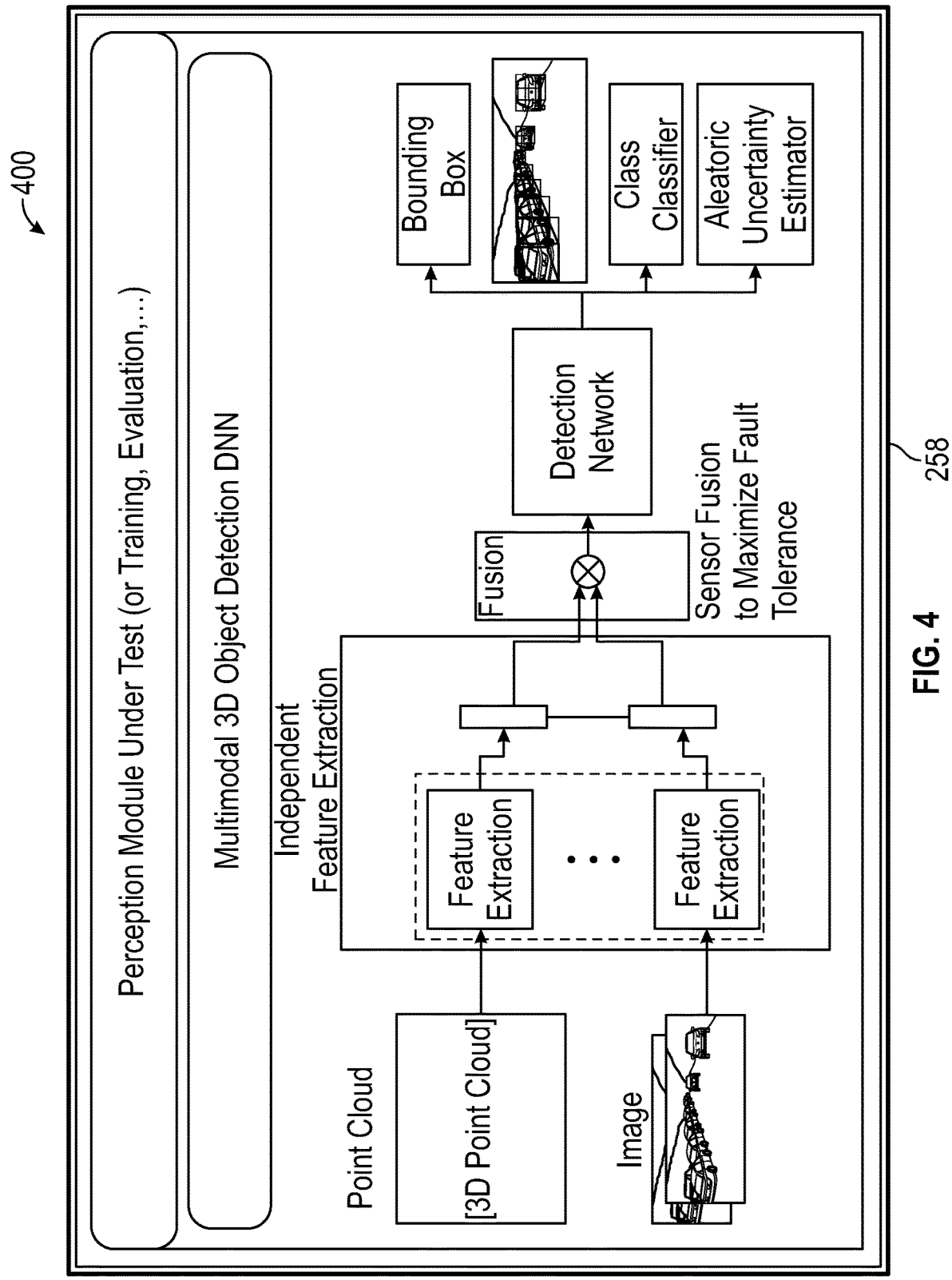
FIG. 4 depicts an example model-instance training process, in accordance with at least one embodiment.

An example model-instance training process 400 is depicted in FIG. 4. Those of skill in the art are aware of numerous methods, processes, information flows, algorithms, types of machine-learning models, and the like that can be used in a given model-instance training process. The aspects that are depicted by way of example in FIG. 4 are for illustration of one such way. It is noted that the model-instance training process 400 corresponds to the sensing-model instance 256 that is labeled "model under test" in FIG. 2. In this example, a deep neural network (DNN) is being evaluated.

As can be seen in FIG. 4, depth data (e.g., a lidar "point cloud") and visible-light data (e.g., a camera "image") are provided to various feature-extraction processes under the heading of "independent feature extraction," as is known in the art. The output of that portion of the processing is fed into a module to conduct sensor fusion in order to maximize fault tolerance. The result of the fusion process is a detection network, which can then be used to produce outputs similar to those shown in FIG. 1—i.e., class labels and bounding boxes. Also depicted in the model-instance training process 400 as being provided as output is an aleatoric uncertainty estimator, as is known in the art. In at least one embodiment, it is those types of outputs that may be synthesized and summarized and displayed by the model-instance-and-dataset-evaluation system 200 as the test results 260 of FIG. 2.

Moreover, as described herein, multimodal datasets contain data from multiple different sensors of the same or different types. Moreover, successfully computing transformations between the respective viewpoints of those multiple different sensors is an important aspect for performing sensing tasks such as fusion. In accordance with at least some embodiments, the model-instance-and-dataset-evaluation system 200 provides the user 210 with access to these transformations using what is referred to in the present disclosure as the "transform-tree object." In other embodiments, this object may be referred to as the "transform-tree (or "transform tree") module." In the ensuing portion of this disclosure, the transform-tree object is described in connection with the graphical depiction provided in FIG. 3.

Figure 3:
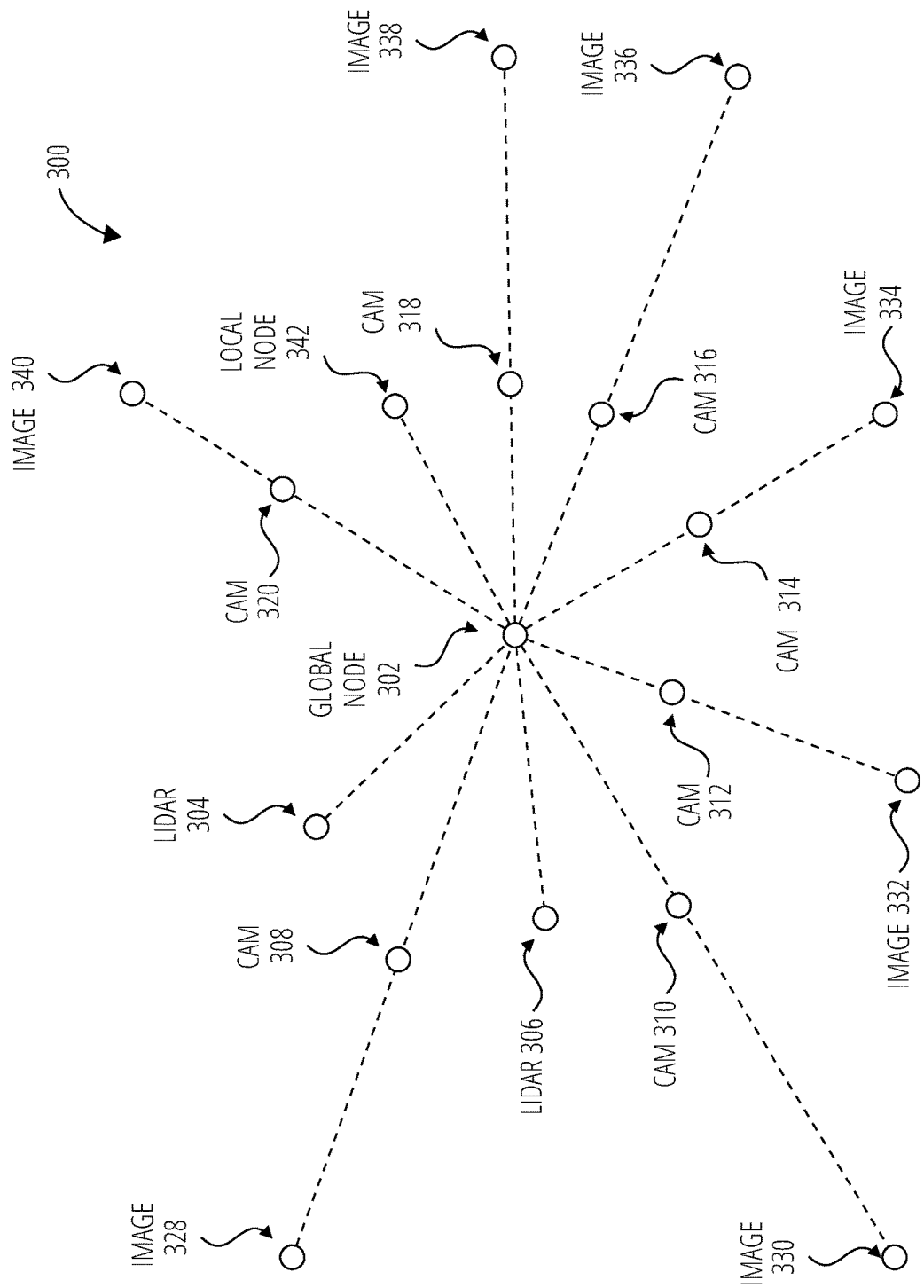
FIG. 3 depicts an example dataframe transform tree, in accordance with at least one embodiment.

FIG. 3 depicts an example dataframe transform tree 300 in accordance with an embodiment. It is noted that the transform-tree object is referred to in the present disclosure at times as a "tree," a "transform tree," a "dataframe transform tree," and the like. In accordance with at least one embodiment, a function (or method) is provided with which the user 210 can have displayed, as a visual output, a graphical representation of the dataframe transform tree 300. It is the dataframe transform tree 300 that—in various embodiments—stores, represents, and depicts the geometric relationships and transforms among the multiple different sensors from which data is present in a given multimodal automated-driving dataset. To have displayed a visual representation of the dataframe transform tree 300 such as is shown in FIG. 3, a user may enter the following:

Example Input

>>data_frame.transform_tree.draw( )

Example Output

[shown in FIG. 3]

As can be seen in FIG. 3, the depicted example dataframe transform tree 300 includes, at its center, a global node 302. In the context of the dataset being an automated-driving dataset, the global node 302 may represent a center of mass of the corresponding vehicle. The dataframe transform tree 300 further includes a camera 308 associated with an image 328, a camera 310 associated with an image 330, a camera 312 associated with an image 332, a camera 314 associated with an image 334, a camera 316 associated with an image 336, a camera 318 associated with an image 338, and a camera 320 associated with an image 340. The dataframe transform tree 300 also includes a LIDAR sensor 304 and a LIDAR sensor 306. Additionally, the dataframe transform tree 300 includes a local node 342. Certainly other structures could be used as well, and the arrangement shown in FIG. 3 is provided purely by way of example.

Each camera node is directly connected to the global node 302, and each associated image node is connected to the corresponding camera node, and only indirectly with the global node 302. It is noted that, for each pair of a camera node and an image node as described above (e.g., the pair of the camera 318 and the image 338), the camera 318 node represents the 3D camera coordinate frame, whereas the image 338 node represents the 2D coordinate frame, i.e. the projection to pixel coordinates on the image plane of the 3D location of the camera 318.

As described herein, among the advances of embodiments of the present disclosure is to provide a generalized representation of an automated-driving dataset (as an example type of dataset). This new generalized representation of any given dataset helps handle the above-described heterogeneity of datasets, and has the positive impact of making it much easier to more robustly cross-domain train instances of machine-learning sensing models. In at least one embodiment, prior to being used for model-instance training, an automated-driving dataset is converted (e.g., ported, mapped, and/or the like) to the aforementioned generalized representation, which is referred to as "GenRep" for short in a number of places in the present disclosure. Once a given dataset has been represented in GenRep, that standardized dataset can then be used to generate machine-learning inputs and machine-learning outputs in connection with a vast variety of machine-learning models.

As a general matter, with respect to a given MultiModal-Dataset, the transform-tree structure holds all of the associated sensors' intrinsic and extrinsic data, as well as the relationships between the different coordinate frames. Those relationships may also be referred to as "homogeneous transformations," and may include data elements such as translations and rotation matrices that are used to find the coordinates in a second coordinate frame of a point originally specified in a first coordinate frame. Generally stated, an object's position with respect to a first sensor (e.g., a first camera) will be different than the same object's position with respect to a second sensor (e.g., a second camera), and the herein-discussed transforms are what are used to convert a specification of a given point, object, and/or the like from one coordinate frame to another. This conversion can be implemented in at least one embodiment using a function referred to herein as "get_transform( )". If the user wished to, for example, obtain a transform from the camera 308 to the camera 316, the user could use the following example syntax:

Example Input

>>transform=transform_tree.get_transform
  (base_frame='CAM_LEFT',
  target_frame='CAM_RIGHT')

Example Output

[transform from camera 308 to camera 316 (not shown)]

An example is given below in which the content of an example transform is shown. Thus, as stated, in connection with at least one embodiment, the model-instance-and-dataset-evaluation system 200 provides users with a function with which they can obtain a transform (also referred to at times as a "transformation," "transformation matrix," and the like) between any two sensors represented in the multimodal dataset. To do this, a user may invoke the get_transform( ) function. In at least one embodiment, get_transform ( ) takes two arguments: a source sensor and a target sensor, and outputs a transform from the source sensor to the target sensor. Another example is shown below:

Example Input

>>data_frame.transform_tree.get_transform('camera
  312', 'camera 320')

Example Output

Transform(translation=[[13.0], [−12.5], [22.0]], rotation=quaternion(0.390448553340722, 0.161729117481986, −0.346828988875658, −0.837319098210547))

The user 210 would thus be equipped with the provided transform to convert from the coordinate frame of the camera 312 to the coordinate frame of the camera 320.

In various examples, and using Python as an example programming environment, systems (such as the model-instance-and-dataset-evaluation system 200) in accordance with embodiments of the present disclosure can be integrated with other Python modules such as 'matplotlib' and 'pytorch visualization' to further explore the content of a given automated-driving dataset. In many instances, this type of dataset exploration is highly beneficial to sensing-model developers and sensing-model evaluators. This sort of exploration can often help such developers and evaluators determine data-manipulation needs, such as corrections in data labels, among many other examples that could be listed here. The following input and output illustrates an example for retrieving camera information with annotations and plotting it with matplotlib. An example output is displayed in FIG. 7.

Example Input

>>import matplotlib.pyplot as plt
>>import system.visualization as vis
>>fig=vis.visualize_image_channel(data_frame, 'CAM_TOP', include_cropped=True, figsize=(10, 10))

Example Output

Figure 7:
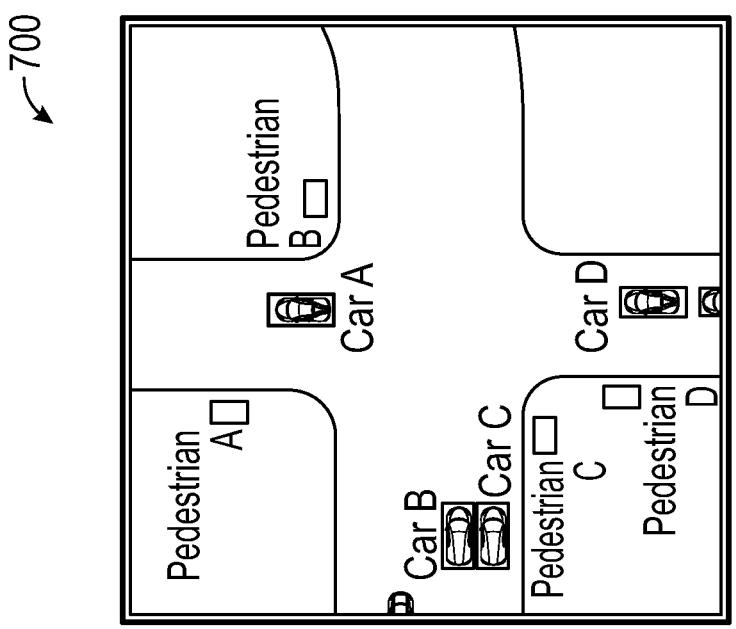
FIG. 7 depicts a first example visualization output, in accordance with at least one embodiment.

[shown in FIG. 7]

As shown in the example visualization output 700 of FIG. 7, a view from an elevated camera shows annotations and bounding boxes on a number of cars and a number of pedestrians.

As a general matter, datasets usually contain ground-truth annotations on a per-frame basis to support the supervised training of sensing-model instances, the validation of the trained model instances on the particular subset of data, and the like. As described elsewhere in the present disclosure, an annotation is often represented by (i) a bounding box positioned and oriented in a specific frame, (ii) a category label, (iii) an instance id, and (if needed) (iv) additional metadata. Embodiments of the present disclosure provide access to not only individual annotations within the dataset content but also to their properties and transformations.

The ensuing portion of the present disclosure provides an example of using a system such as the model-instance-and-dataset-evaluation system 200 to selectively work with annotations, including retrieving the content of the annotations, and also including obtaining the transform for one of the ground-truth labels from a sensor point of view using what is referred to herein as a "transform( ) function" (not to be confused with the above-introduced "get_transform( )" function). An example of this is illustrated in the following sequence of two example-input-and-example-output pairs:

Example Input

```
>>annotation=data_frame.annotations[0]
>>annotation=annotation.to_dict( )
>>annotation.from_dict(annotation_dict)
```

Example Output

Annotation (frame=local, label=Car, instance_id=179, x=−170.04, y=−68.49, z=0.71, l=4.15, w=2.00, h=1.38, orientation=quaternion(0.999998588419645, −1.69035558049598e-06, 0.00165915452109061, −0.000265258621949871))

The above input-and-output pair demonstrate an example of retrieving the content of a given example annotation. Below is an example of using transform( ) to obtaining the transform for one of the ground-truth labels from a sensor point of view. The example sensor in this case is LIDAR sensor 304.

Example Input

```
>>annotation.transform(data_frame.transform_tree,
   'LIDAR_304')
>>annotation
```

Example Output

Annotation(frame=LIDAR_304, label=Car, instance_id=179, x=105.27, y=−105.29, z=115.60, l=4.15, w=2.00, h=1.38, orientation=quaternion (0.129349980671903, 0.316350982604729, 0.868463135478252, −0.359113381288535))

As can be seen in the above-two example outputs, the "label" and "instance_id" have the same value in both example outputs (as do the dimensions of the bounding box), but every other value has changed to correspond to the requested coordinate frame of the LIDAR sensor 304. That set of changed values appropriately corresponds to the different position and rotation values in the two different coordinate frames.

Moreover, in embodiments of the present disclosure, the model-instance-and-dataset-evaluation system 200 enables users to provide training labels in the frame of reference of the sensing algorithms in either in 2D or 3D. The following portion of this disclosure illustrates an example of extracting a 3D object (box) (identified by, as an example, the camera 312) and a 2D object (Rect) targeted to the local coordinate frame of reference of the image 328 associated with the camera 308.

Example Input

```
>>from system import geometry as geo
>>box=geo.Box.from_annotation(annotation)
>>box
```

Example Output

Box(frame=CAM_312, label=Car, instance_id=179, x=105.27, y=−105.29, z=115.60, l=4.15, w=2.00, h=1.38, q=quaternion(0.129349980671903, 0.316350982604729, 0.868463135478252, −0.359113381288535))

Example Input

```
>>rect=geo.Rect.from_annotation(annotation,
   data_frame.transform_tree, 'IMAGE_328')
>>print(rect)
```

Example Output

Rect (frame=IMAGE_328, label=None, instance_id=179, xc=591.46, yc=−68.85, w=12.83, h=7.66, orientation=0.00)

Figure 8:
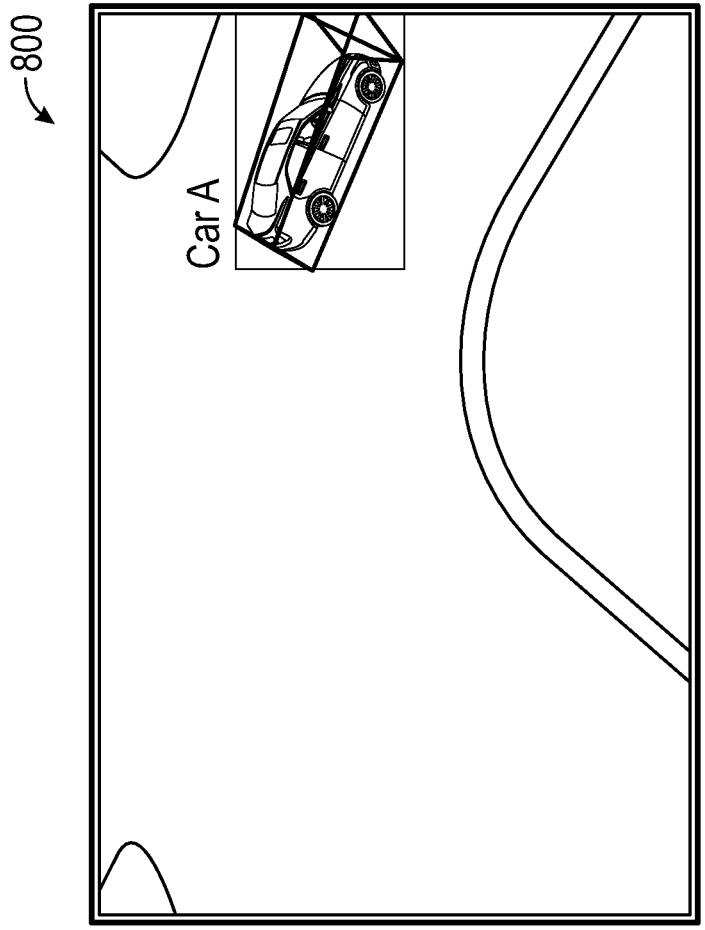
FIG. 8 depicts a second example visualization output, in accordance with at least one embodiment.

A visualization of the resulting 2D/3D labels is displayed in the example visualization output 800 of FIG. 8. In that visualization are 2D and 3D label annotations rendered after applied to sensor input from the perspective of image 328, which is the projection onto the 2D image plane of the 3D location of the camera 308. Certainly many other examples could be provided as well.

FIG. 9 depicts an example visualization output 900, in accordance with at least one embodiment. In particular, the visualization output 900 includes a left-hand frame from the perspective of a "top camera" oriented vertically above the relevant area, and also includes a right-hand frame from the perspective of a different available camera, showing a different perspective of the same moment in time. It can be seen that a given annotation can visually appear on a user interface in different coordinates in a given 2D plane (i.e., the depicted images) while still corresponding to a common 3D, real-world location.

The visualization output 900 shows an example of a label-customization capability that is provided by one or more embodiments of the present disclosure. Indeed, in some embodiments, a system supports the creation of customized annotations, which can have several purposes. One example such purpose would be to strategically add false positives to a dataset in order to evaluate the robustness of a given multimodal detection algorithm. In an embodiment, annotations can be manually created by defining their attributes (e.g., {frame, label, position, orientation, size, instanceID}) and initializing what is referred to herein as the "Annotation" class. Example commands and results related to this function may be similar to the following:

Example Input

>>annotation=Annotation(frame, label, position, orientation, size, instance_id=123)
>>annotation Example Output Annotation (frame=local, label=Car, instance_id=123, x=0.00, y=0.00, z=0.00, l=1.50, w=5.00, h=2.00, orientation=quaternion(1, 0, 0, 0))

Moreover, in various embodiments, a custom label can be saved with the rest of the particular dataset. Approaches similar to this could be used in some embodiments by users to correct labeling errors that are often present in existing datasets. Another use could be to harmonize labeling differences across datasets, facilitating resolution of domain transfer issues in sensing tasks.

Additionally, another set of functions that are provided by systems in accordance with some embodiments of the present disclosure are referred to here as dataset-label-exploration functions and dataset-label-synchronization functions. Thus, in addition to customization of labels as described above, embodiments provide users with capabilities of exploration and statistical analysis of existing labels in a given dataset. In some embodiments, one or more mapping functions are also provided to enable users to integrate label differences across datasets. This can be quite helpful in order to harmonize labels across datasets for purposes such as cross-domain training of a given machine-learning-model instance. Following are several examples of dataset-label-exploration-and-synchronization functions, one or more of which may be provided in various embodiments.

One example dataset-label-exploration function is referred to herein as "class_mapping( )". In an embodiment, the class_mapping( ) function provides a reference-label encoding for classification tasks to be performed by a model instance. The class_mapping( ) function may also provide a user with an overview of a number of instances of each label in a given dataset. For example, a call to the class_mapping( ) function for a given dataset may involve input and produce output such as:

Example Input

>>class_mapping(exampleDataset)

Example Output

{'animal': 1,
'human.pedestrian.adult': 2,
'human.pedestrian.child': 3,
'movable_object.traffic_cone': 12,
'vehicle.bicycle': 13,
'vehicle.bus': 15,
'vehicle.car': 16,
'vehicle.emergency.police': 19,
'vehicle.motorcycle': 20}

It is noted that, in some embodiments, the dataset (i.e., "exampleDataset") need not be specified as an argument of this function (and this is equally true of several other functions disclosed herein as well). In such embodiments, the current dataset with which a user is working at the time is the presumed argument. The name "exampleDataset" is shown as an argument to various functions in the present disclosure in order to hopefully provide increased clarity to the reader.

Furthermore, in at least one embodiment, a function "class_labels( )" returns the keys of the dictionary of labels of a given dataset. For example, continuing the above example, a call to the class_labels( ) function for the same example dataset may involve input and produce output such as:

Example Input

>>class_labels(exampleDataset)

Example Output dict_keys(['animal', 'human.pedestrian.adult',
'human.pedestrian.child', 'movable_object.traffic_cone',
'vehicle.bicycle', 'vehicle.bus', 'vehicle.car',
'vehicle.emergency.police', 'vehicle.motorcycle'])

As another example, in at least one embodiment, a function "label_mapping( )" can be used to combine or harmonize label datasets. For example, and again using the same example dataset, a user may wish to consolidate the labels 'human.pedestrian.adult' and 'human.pedestrian.child' into a single label called 'person'. The same user may also wish to combine all motorized vehicles (i.e., 'vehicle.bus', 'vehicle.car', 'vehicle.emergency.police', and 'vehicle.motorcycle') into a single label called simply 'vehicle'. Thirdly, the user may wish to combine 'animal' and 'movable_object.traffic_cone' into a single label called 'object'. In that example, the user could enter the following call to the label_mapping( ) function to achieve this, and perhaps receive the ensuing confirmation message.

Example Input (Linebreaks Inserted for Readability)

>>label_mapping(exampleDataset,
{'animal': 'object',
'human.pedestrian.adult': 'person',
'human.pedestrian.child': 'person',
'movable_object.traffic_cone': 'object',
'vehicle.bicycle': 'vehicle',
'vehicle.bus': 'vehicle',
'vehicle.car': 'vehicle',
'vehicle.emergency.police': 'vehicle',
'vehicle.motorcycle': 'vehicle'})

Example Output status: label_mapping( ) completed successfully

If the user executed that example command and then, in order to check the results of that operation, again called the class_mapping( ) function, the resulting input and output in at least one embodiment would be:

Example Input

>>class_mapping(exampleDataset)

Example Output

{'person': 5, 'object': 13, 'vehicle': 83}

It can be seen that the total number of classified items is one hundred one (101) in both the uncombined example above and the combined example here. Furthermore, a post-combining call to the class_labels( ) function would in at least one embodiment involve the following input and yield the following output:

Example Input

>>class_labels(exampleDataset)

Example Output dict_keys(['person', 'object', 'vehicle'])

And certainly numerous other examples could be provided here as well and will occur to those of skill in the art having the benefit of the present disclosure.

Embodiments of the present disclosure provide, via a user interface, users with one or more graphs, plots, and/or the like, to assist the user in visualizing the contents of a given dataset, the results of a given run of a given model instance on a given dataset, a given set of runs of a given model instance on one or more different datasets, and so forth. A user may utilize one or more of these plots to gain a better understanding of aspects of the labels in a dataset such scale, distribution, and/or the like. Four such example plots are provided in FIG. 10, FIG. 11, FIG. 12, and FIG. 13. These plots are not extensively described in the present disclosure, but provide an illustrative example of how data may be classified, analyzed, and represented.

Figure 10:
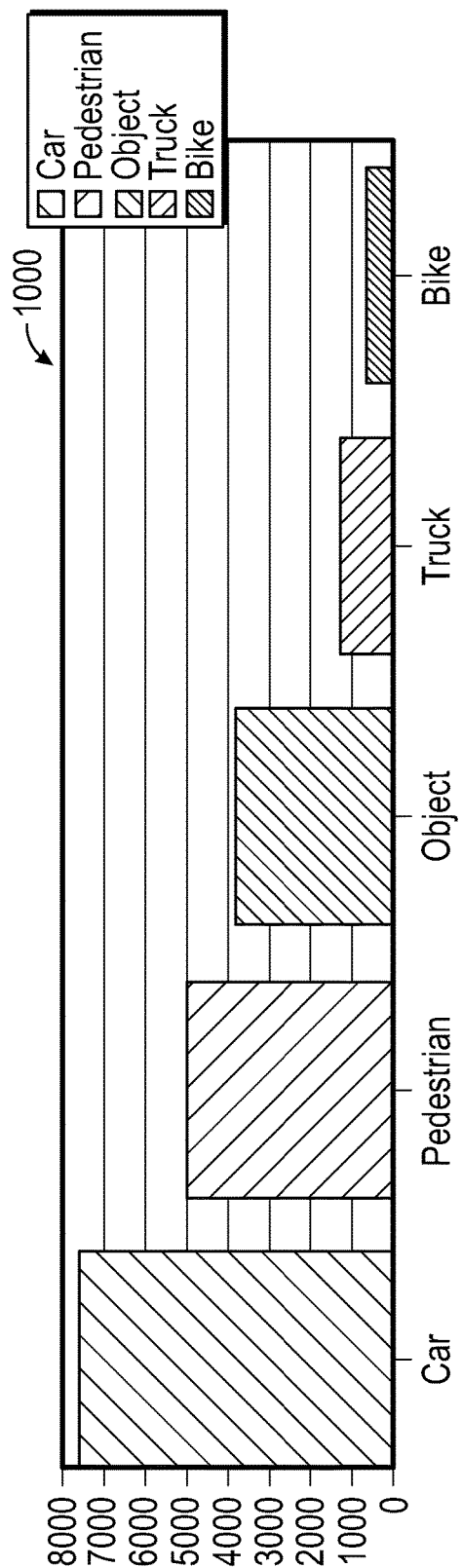
FIG. 10 depicts an example class-statistics plot, in accordance with at least one embodiment.
Figure 11:
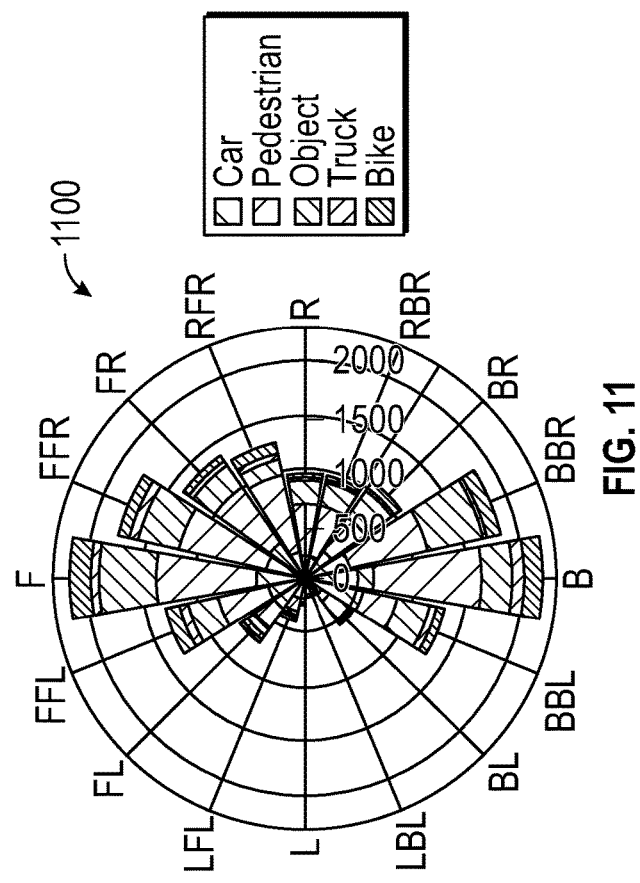
FIG. 11 depicts an example polar-bar plot, in accordance with at least one embodiment.

FIG. 10 depicts an example class-statistics plot 1000, showing a raw number of each of a number of object classes identified during execution of one or more model instances on one or more datasets. FIG. 11 depicts an example polar-bar plot 1100, relating the number of instances of identification of various classes of objects to the rotational position at which (or slice of rotational space in which) such objects were identified. The "F" stands for "front," the "R" for "right," the "L" for left, and the "B" for "back" (or "behind" or "backwards," etc.). These initials may be in reference to cameras and/or other sensors in a 360-degree field in which a given system is identifying objects.

Figure 12:
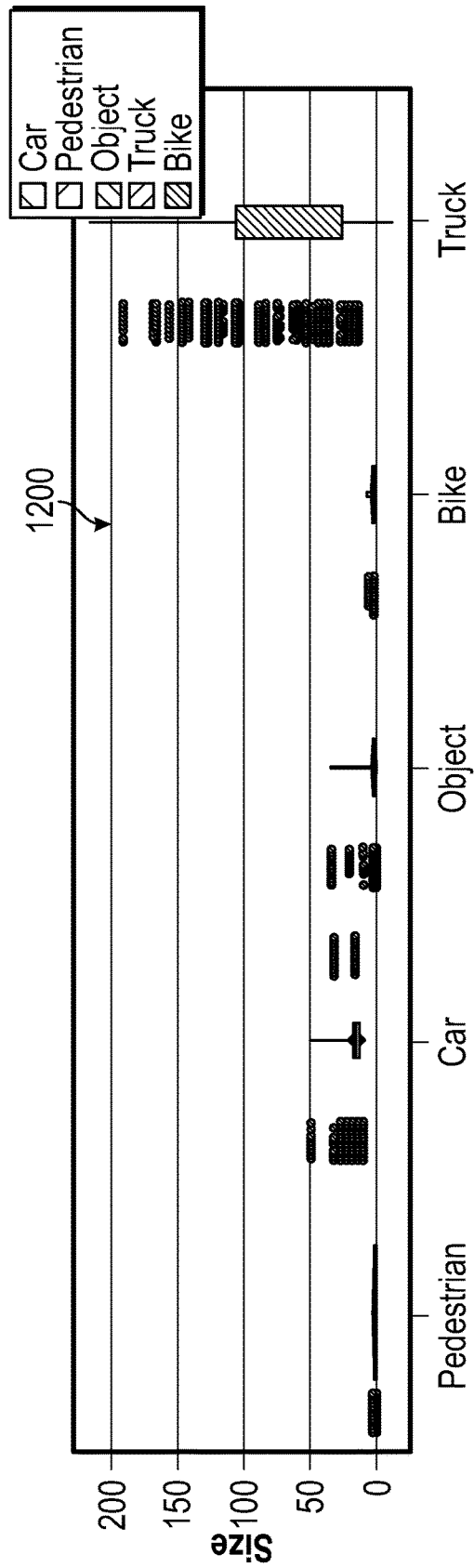
FIG. 12 depicts an example size-statistics plot, in accordance with at least one embodiment.
Figure 13:
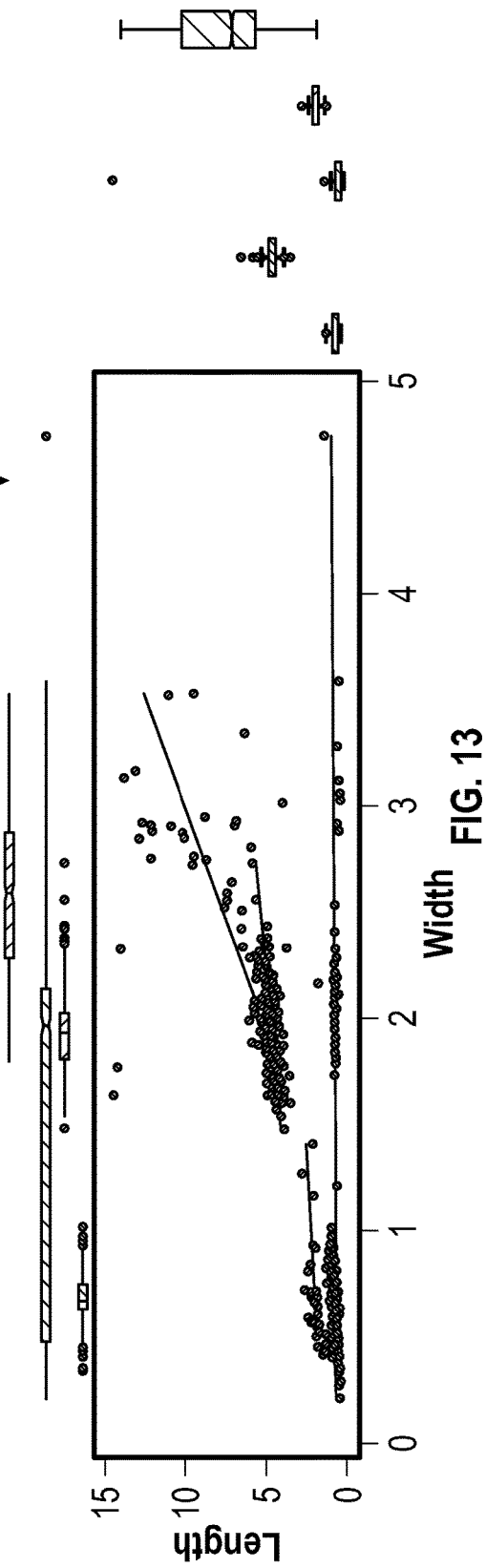
FIG. 13 depicts an example size-distribution plot, in accordance with at least one embodiment.

FIG. 12 depicts an example size-statistics plot 1200, relating instances of identified classes of objects to determined respective (2D or 3D) sizes of those objects. Lastly, FIG. 13 depicts an example size-distribution plot 1300, depicting an example set of distributions of length-width combinations among various classes of identified objects. Certainly many other variations on these types of plots, as well as many other types of plots, could be generated in connection with a given implementation, as deemed suitable by those of skill in the art in a given context.

Figure 14:
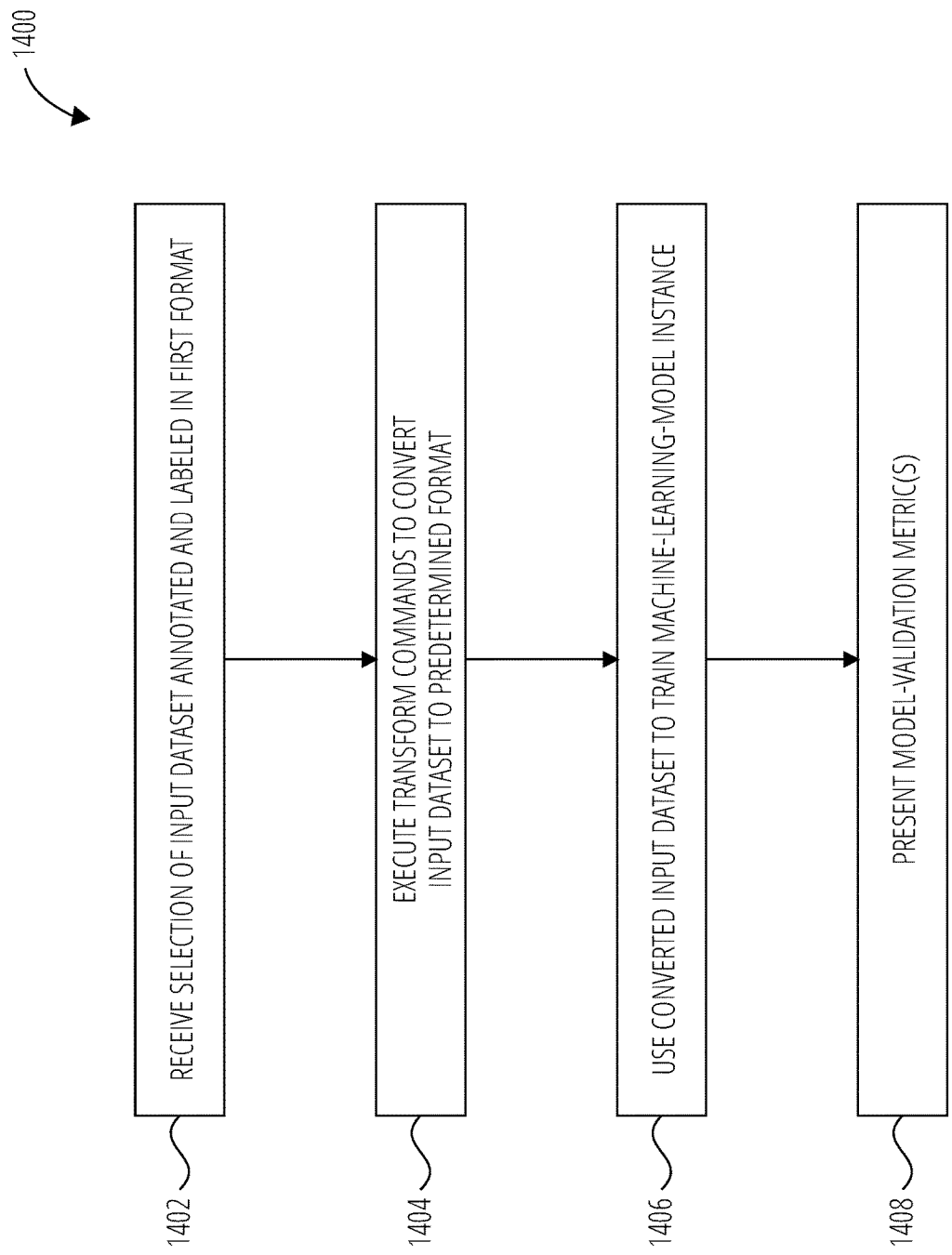
FIG. 14 depicts an example method, in accordance with at least one embodiment.

FIG. 14 depicts an example method 1400, in accordance with at least one embodiment. By way of example, the method 1400 is described by way of example as being performed by the model-instance-and-dataset-evaluation system 200. Many of the aspects of the method 1400 are discussed elsewhere in the present disclosure, and therefore are not redundantly described here.

At operation 1402, the model-instance-and-dataset-evaluation system 200 receives, via an API, an input-dataset selection identifying an input dataset. The input dataset includes a plurality of dataframes that are in a first dataframe format and that have annotations corresponding to one or more sensing tasks performed with respect to the dataframes. In an embodiment, each dataframe is an ordered data structure including time-aligned multimodal sensor input, and each dataframe is annotated with one or more ground-truth labels corresponding to the one or more sensing tasks performed with respect to the dataframe. The model-instance-and-dataset-evaluation system 200 may ingest, responsive to receiving the input-dataset selection, the input dataset into data storage.

At operation 1404, the model-instance-and-dataset-evaluation system 200 executes a plurality of dataframe-transformation functions. The execution of the plurality of dataframe-transformation functions converting the dataframes of the input dataset into a predetermined dataframe format. In at least one embodiment, the predetermined dataframe format is used by the model-instance-and-dataset-evaluation system 200 for one or more of testing, training, and validating instances of machine-learning models.

At operation 1406, the model-instance-and-dataset-evaluation system 200 uses the converted dataframes of the input dataset to train an instance of a first machine-learning model to perform at least a subset of the one or more sensing tasks, which, in an embodiment, correspond to the ground-truth labels as converted into the predetermined dataframe format. At operation 1408, the model-instance-and-dataset-evaluation system 200 presents, via an API (e.g., via a user interface) of the model-instance-and-dataset-evaluation system 200, one or more model-validation metrics pertaining to the training of the instance of the first machine-learning model.

In an embodiment, model-validation metrics reflect how well a given instance of a given machine-learning model is fulfilling a given sensing (or perception) task, which in various embodiments can include one or more of detection, classification, prediction, and/or the like. Once or more model-training metrics may also be provided. Some example model-training metrics include amount of time to ingest the data, amount of time to update the internal hyperparameters, consumed computational resources, how fast it is converging to ground-truth performance, and/or the like.

As mentioned above, two datasets may be considered to be in (or "representative of," etc.) different domains based on differing from one another in one or more of the following dataset dimensions: geolocation of data collection, times and days of data collection, onboard sensor configuration, onboard sensor types, label names in the dataset, tasks on which a given autonomous vehicle is being evaluated, and/or the like. Differences along dimensions such as geolocation of data collection, times and days of data collection, tasks on which a given autonomous vehicle is being evaluated, and the like do not present a domain transfer issue in and of themselves, as they are related to dataset content rather than format. Indeed, having a variety of dataset inputs across dimensions such as those enhances the robustness of a trained model instance.

Other differences along dimensions such as sensor configuration, sensor type, label names, and the like do make a difference in dataframe format, and it is these types of differences on which embodiments of the present disclosure are focused. Thus, a system in accordance with at least one embodiment may receive two different datasets that differ from one another along dimensions related to dataframe format, and may process each of those two datasets separately to convert each to a predetermined format used by the system in testing, training, evaluating, etc. various different machine-learning-model instances.

Figure 15:
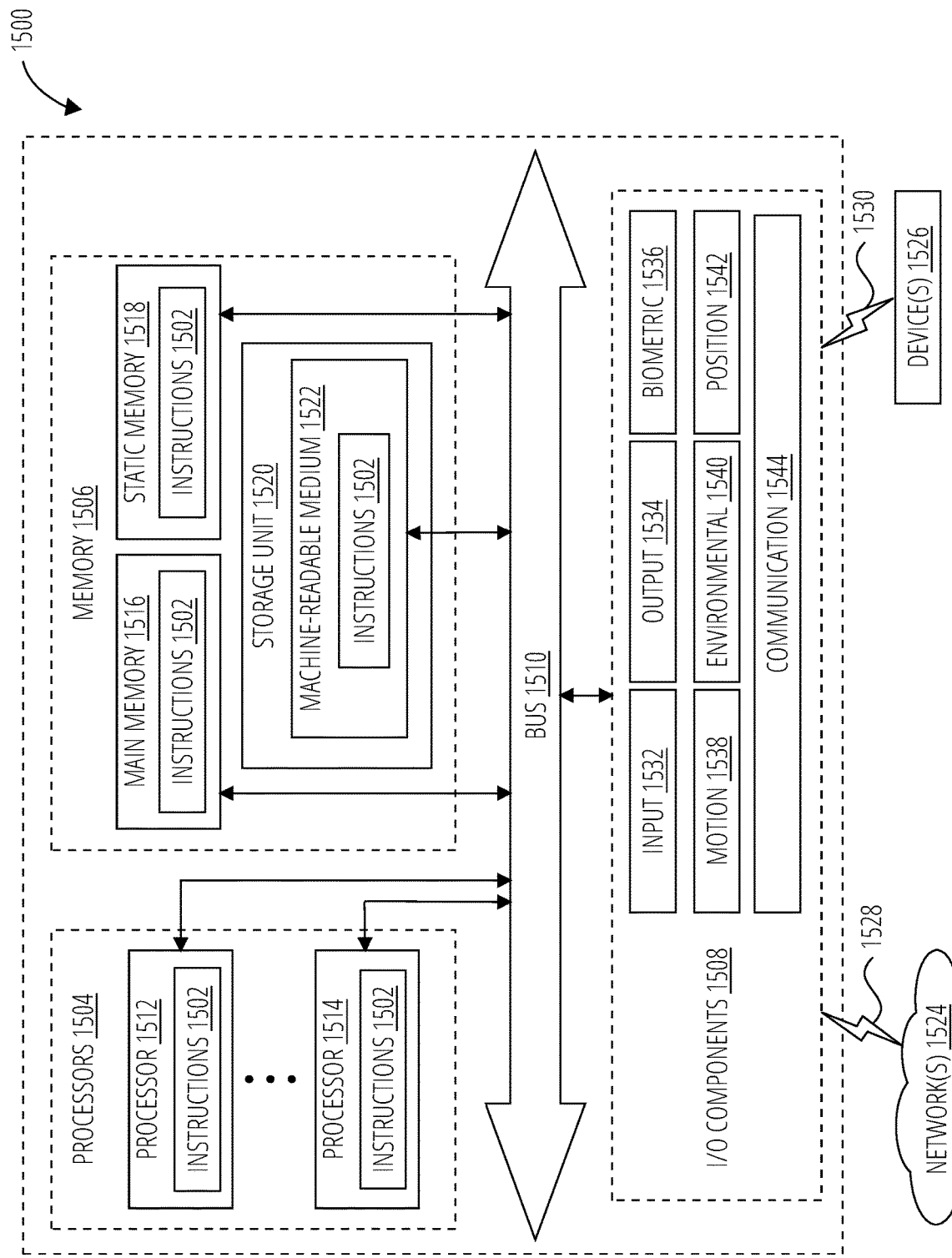
FIG. 15 depicts an example computer system, in accordance with at least one embodiment.

FIG. 15 depicts an example computer system 1500 within which instructions 1502 (e.g., software, firmware, a program, an application, an applet, an app, a script, a macro, and/or other executable code) for causing the computer system 1500 to perform any one or more of the methodologies discussed herein may be executed. In at least one embodiment, execution of the instructions 1502 causes the computer system 1500 to perform one or more of the methods described herein. In at least one embodiment, the instructions 1502 transform a general, non-programmed computer system into a particular computer system 1500 programmed to carry out the described and illustrated functions. The computer system 1500 may operate as a standalone device or may be coupled (e.g., networked) to and/or with one or more other devices, machines, systems, and/or the like. In a networked deployment, the computer system 1500 may operate in the capacity of a server and/or a client in one or more server-client relationships, and/or as one or more peers in a peer-to-peer (or distributed) network environment.

The computer system 1500 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 1502, sequentially or otherwise, that specify actions to be taken by the computer system 1500. And while only a single computer system 1500 is illustrated, there could just as well be a collection of computer systems that individually or jointly execute the instructions 1502 to perform any one or more of the methodologies discussed herein.

As depicted in FIG. 15, the computer system 1500 may include processors 1504, memory 1506, and I/O components 1508, which may be configured to communicate with each other via a bus 1510. In an example embodiment, the processors 1504 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 1512 and a processor 1514 that execute the instructions 1502. The term "processor" is intended to include multi-core processors that may include two or more independent processors (sometimes referred to as "cores") that may execute instructions contemporaneously. Although FIG. 15 shows multiple processors 1504, the computer system 1500 may include a single processor with a single core, a single processor with multiple cores (e.g., a multi-core processor), multiple processors with a single core, multiple processors with multiples cores, or any combination thereof.

The memory 1506, as depicted in FIG. 15, includes a main memory 1516, a static memory 1518, and a storage unit 1520, each of which is accessible to the processors 1504 via the bus 1510. The memory 1506, the static memory 1518, and/or the storage unit 1520 may store the instructions 1502 executable for performing any one or more of the methodologies or functions described herein. The instructions 1502 may also or instead reside completely or partially within the main memory 1516, within the static memory 1518, within machine-readable medium 1522 within the storage unit 1520, within at least one of the processors 1504 (e.g., within a cache memory of a given one of the processors 1504), and/or any suitable combination thereof, during execution thereof by the computer system 1500. In at least one embodiment, the machine-readable medium 1522 includes one or more non-transitory computer-readable storage media.

Furthermore, also as depicted in FIG. 15, I/O components 1508 may include a wide variety of components to receive input, produce and/or provide output, transmit information, exchange information, capture measurements, and/or the like. The specific I/O components 1508 that are included in a particular instance of the computer system 1500 will depend on the type of machine. For example, portable machines such as mobile phones may include a touch input device or other such input mechanisms, while a headless server machine may not include such a touch input device. Moreover, the I/O components 1508 may include many other components that are not shown in FIG. 15.

In various example embodiments, the I/O components 1508 may include input components 1532 and output components 1534. The input components 1532 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 1534 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 1508 may include, as examples, biometric components 1536, motion components 1538, environmental components 1540, and/or position components 1542, among a wide array of possible components. As examples, the biometric components 1536 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 1538 may include acceleration-sensing components (e.g., an accelerometer), gravitation-sensing components, rotation-sensing components (e.g., a gyroscope), and/or the like.

The environmental components 1540 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 1542 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 1508 may further include communication components 1544 operable to communicatively couple the computer system 1500 to one or more networks 1524 and/or one or more devices 1526 via a coupling 1528 and/or a coupling 1530, respectively. For example, the communication components 1544 may include a network-interface component or another suitable device to interface with a given network 1524. In further examples, the communication components 1544 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 1526 may include one or more other machines and/or any of a wide variety of peripheral devices (e.g., a peripheral device coupled via a universal serial bus (USB) connection).

Moreover, the communication components 1544 may detect identifiers or include components operable to detect identifiers. For example, the communication components 1544 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 1544, such as location via IP geolocation, location via Wi-Fi signal triangulation, location via detecting an NFC beacon signal that may indicate a particular location, and/or the like.

One or more of the various memories (e.g., the memory 1506, the main memory 1516, the static memory 1518, and/or the (e.g., cache) memory of one or more of the processors 1504) and/or the storage unit 1520 may store one or more sets of instructions (e.g., software) and/or data structures embodying or used by any one or more of the methodologies or functions described herein. These instructions (e.g., the instructions 1502), when executed by one or more of the processors 1504, cause performance of various operations to implement various embodiments of the present disclosure.

The instructions 1502 may be transmitted or received over one or more networks 1524 using a transmission medium, via a network-interface device (e.g., a network-interface component included in the communication components 1544), and using any one of a number of transfer protocols (e.g., the Session Initiation Protocol (SIP), the HyperText Transfer Protocol (HTTP), and/or the like). Similarly, the instructions 1502 may be transmitted or received using a transmission medium via the coupling 1530 (e.g., a peer-to-peer coupling) to one or more devices 1526. In some embodiments, IoT devices can communicate using Message Queuing Telemetry Transport (MQTT) messaging, which can be relatively more compact and efficient.

In view of the disclosure above, a listing of various examples of embodiments is set forth below. It should be noted that one or more features of an example, taken in isolation or combination, should be considered to be within the disclosure of this application.

Example 1 is a system including: at least one hardware processor; and at least one memory storing instructions that, when executed by the at least one hardware processor, cause the at least one hardware processor to: receive, via a first application programming interface (API), an input-dataset selection identifying an input dataset, the input dataset including a plurality of dataframes that are in a first dataframe format and that have annotations corresponding to one or more sensing tasks performed with respect to the dataframes; execute a plurality of dataframe-transformation functions to convert the plurality of dataframes of the input dataset into a predetermined dataframe format; train an instance of a first machine-learning model using the converted dataframes of the input dataset to perform at least a subset of the one or more sensing tasks; and output, via the first API, one or more model-validation metrics pertaining to the training of the instance of the first machine-learning model.

Example 2 is the system of Example 1, where: the input dataset includes an automated-driving dataset; and the first machine-learning model includes a sensing model for a sensing system of a vehicle.

Example 3 is the system of Example 1 or Example 2, where the first API includes a user interface.

Example 4 is the system of any of the Examples 1-3, where the first API provides access to functions for receiving the input-dataset selection and for ingesting the input dataset.

Example 5 is the system of any of the Examples 1-4, further including operating according to at least a second API, the second API providing access to the plurality of dataframe-transformation functions for converting the dataframes of the input dataset from the first dataframe format to the predetermined dataframe format.

Example 6 is the system of any of the Examples 1-5, where: each dataframe is an ordered data structure including time-aligned multimodal sensor input; and the annotations include one or more ground-truth labels corresponding to the one or more sensing tasks performed with respect to the dataframes.

Example 7 is the system of Example 6, where the at least a subset of the one or more sensing tasks corresponds to the ground-truth labels as converted to the predetermined dataframe format.

Example 8 is the system of any of the Examples 1-7, where the predetermined dataframe format is used by the system for one or more of testing, training, and validating instances of machine-learning models.

Example 9 is the system of any of the Examples 1-8, where the instructions, when executed by the at least one hardware processor, further cause the at least one hardware processor to: receive, via the first API, a second input-dataset selection identifying a second input dataset, the second input dataset including a second plurality of dataframes that are in a second dataframe format and that have annotations corresponding to one or more sensing tasks performed with respect to the dataframes; execute a second plurality of dataset-transformation functions to convert the second plurality of dataframes of the second input dataset into the predetermined dataframe format; train the instance of the first machine-learning model using the converted dataframes of the second input dataset to perform at least a subset of the one or more sensing tasks; and output, via the first API, one or more model-validation metrics pertaining to the training of the instance of the first machine-learning model based also on the second input dataset.

Example 10 is the system of any of the Examples 1-9, where the instructions, when executed by the at least one hardware processor, further cause the at least one hardware processor to provide a transform-tree-draw function accessible via the first API, the transform-tree-draw function generating a visual depiction of a transform tree of the labels in the predetermined dataframe format.

Example 11 is the system of any of the Examples 1-10, where the instructions, when executed by the at least one hardware processor, further cause the at least one hardware processor to provide an annotation-transform function accessible via the first API, the annotation-transform function computing and presenting a transform of a ground-truth-label annotation of a dataframe in a local coordinate system of a specified target sensor.

Example 12 is the system of any of the Examples 1-11, where the instructions, when executed by the at least one hardware processor, further cause the at least one hardware processor to provide a plurality of functions accessible via the first API for auditing, changing, and merging labels in the input dataset.

Example 13 is at least one non-transitory computer-readable storage medium containing instructions that, when executed by at least one hardware processor, cause the at least one hardware processor to perform operations to: receive, via a first application programming interface (API), an input-dataset selection identifying an input dataset, the input dataset including a plurality of dataframes that are in a first dataframe format and that have annotations corresponding to one or more sensing tasks performed with respect to the dataframes; execute a plurality of dataframe-transformation functions to convert the plurality of dataframes of the input dataset into a predetermined dataframe format; train an instance of a first machine-learning model using the converted dataframes of the input dataset to perform at least a subset of the one or more sensing tasks; and output, via the first API, one or more model-validation metrics pertaining to the training of the instance of the first machine-learning model.

Example 14 is the non-transitory computer-readable storage medium of Example 13, where: the input dataset includes an automated-driving dataset; and the first machine-learning model includes a sensing model for a sensing system of a vehicle.

Example 15 is the non-transitory computer-readable storage medium of Example 13 or Example 14, where the first API includes a user interface.

Example 16 is the non-transitory computer-readable storage medium of any of the Examples 13-15, where the first API provides access to functions for receiving the input-dataset selection and for ingesting the input dataset.

Example 17 is the non-transitory computer-readable storage medium of any of the Examples 13-16, further including operating according to at least a second API, the second API providing access to the plurality of dataframe-transformation functions for converting the dataframes of the input dataset from the first dataframe format to the predetermined dataframe format.

Example 18 is the non-transitory computer-readable storage medium of any of the Examples 13-17, where: each dataframe is an ordered data structure including time-aligned multimodal sensor input; and the annotations include one or more ground-truth labels corresponding to the one or more sensing tasks performed with respect to the dataframes.

Example 19 is the non-transitory computer-readable storage medium of Example 18, where the at least a subset of the one or more sensing tasks corresponds to the ground-truth labels as converted to the predetermined dataframe format.

Example 20 is the non-transitory computer-readable storage medium of any of the Examples 13-19, where the predetermined dataframe format is used by the system for one or more of testing, training, and validating instances of machine-learning models.

Example 21 is the non-transitory computer-readable storage medium of any of the Examples 13-20, where the instructions, when executed by the at least one hardware processor, further cause the at least one hardware processor to: receive, via the first API, a second input-dataset selection identifying a second input dataset, the second input dataset including a second plurality of dataframes that are in a second dataframe format and that have annotations corresponding to one or more sensing tasks performed with respect to the dataframes; execute a second plurality of dataset-transformation functions to convert the second plurality of dataframes of the second input dataset into the predetermined dataframe format; train the instance of the first machine-learning model using the converted dataframes of the second input dataset to perform at least a subset of the one or more sensing tasks; and output, via the first API, one or more model-validation metrics pertaining to the training of the instance of the first machine-learning model based also on the second input dataset.

Example 22 is the non-transitory computer-readable storage medium of any of the Examples 13-21, where the instructions, when executed by the at least one hardware processor, further cause the at least one hardware processor to provide a transform-tree-draw function accessible via the first API, the transform-tree-draw function generating a visual depiction of a transform tree of the labels in the predetermined dataframe format.

Example 23 is the non-transitory computer-readable storage medium of any of the Examples 13-22, where the instructions, when executed by the at least one hardware processor, further cause the at least one hardware processor to provide an annotation-transform function accessible via the first API, the annotation-transform function computing and presenting a transform of a ground-truth-label annotation of a dataframe in a local coordinate system of a specified target sensor.

Example 24 is an apparatus including: means for receiving, via a first application programming interface (API), an input-dataset selection identifying an input dataset, the input dataset including a plurality of dataframes that are in a first dataframe format and that have annotations corresponding to one or more sensing tasks performed with respect to the dataframes; means for executing a plurality of dataframe-transformation functions to convert the plurality of dataframes of the input dataset into a predetermined dataframe format; means for training an instance of a first machine-learning model using the converted dataframes of the input dataset to perform at least a subset of the one or more sensing tasks; and means for outputting, via the first API, one or more model-validation metrics pertaining to the training of the instance of the first machine-learning model.

Example 25 is the apparatus of Example 24, where: each dataframe is an ordered data structure including time-aligned multimodal sensor input; and the annotations include one or more ground-truth labels corresponding to the one or more sensing tasks performed with respect to the dataframes.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Furthermore, in this disclosure, in one or more embodiments, examples, and/or the like, it may be the case that one or more components of one or more devices, systems, and/or the like are referred to as modules that carry out (e.g., perform, execute, and the like) various functions. With respect to any such usages in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

In at least one embodiment, the instructions for a given module are executable by the hardware for carrying out the one or more herein-described functions of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium. A module could be realized as a single component or be distributed across multiple components. In some cases, a module may be referred to as a unit.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A system comprising:
   at least one hardware processor; and
   at least one memory storing instructions that, when executed by the at least one hardware processor, cause the at least one hardware processor to:
   receive, via a first application programming interface (API), an input-dataset selection identifying an input dataset, the input dataset comprising a plurality of dataframes that are in a first dataframe format and that have annotations corresponding to one or more sensing tasks performed with respect to the plurality of dataframes;
   execute a plurality of dataframe-transformation functions to convert the plurality of dataframes of the input dataset into a predetermined dataframe format;
   train an instance of a first machine-learning model using the converted plurality of dataframes of the input dataset to perform at least a subset of the one or more sensing tasks; and
   output, via the first API, one or more model-validation metrics pertaining to the training of the instance of the first machine-learning model.

2. The system of claim 1, wherein:
   the input dataset comprises an automated-driving dataset; and
   the first machine-learning model comprises a sensing model for a sensing system of a vehicle.

3. The system of claim 1, wherein the first API comprises a user interface.

4. The system of claim 1, wherein the first API provides access to functions for receiving the input-dataset selection and for ingesting the input dataset.

5. The system of claim 1, further comprising operating according to at least a second API, the second API providing access to the plurality of dataframe-transformation functions for converting the plurality of dataframes of the input dataset from the first dataframe format to the predetermined dataframe format.

6. The system of claim 1, wherein:
   each dataframe is an ordered data structure comprising time-aligned multimodal sensor input; and
   the annotations comprise one or more ground-truth labels corresponding to the one or more sensing tasks performed with respect to the plurality of dataframes.

7. The system of claim 6, wherein the at least a subset of the one or more sensing tasks corresponds to the one or more ground-truth labels as converted to the predetermined dataframe format.

8. The system of claim 1, wherein the predetermined dataframe format is used by the system for one or more of testing, training, and validating instances of machine-learning models.

9. The system of claim 1, wherein the instructions, when executed by the at least one hardware processor, further cause the at least one hardware processor to:
 receive, via the first API, a second input-dataset selection identifying a second input dataset, the second input dataset comprising a second plurality of dataframes that are in a second dataframe format and that have annotations corresponding to one or more sensing tasks performed with respect to the plurality of dataframes;
 execute a second plurality of dataset-transformation functions to convert the second plurality of dataframes of the second input dataset into the predetermined dataframe format;
 train the instance of the first machine-learning model using the converted second plurality of dataframes of the second input dataset to perform at least a subset of the one or more sensing tasks; and
 output, via the first API, the one or more model-validation metrics pertaining to the training of the instance of the first machine-learning model based also on the second input dataset.

10. The system of claim 1, wherein the instructions, when executed by the at least one hardware processor, further cause the at least one hardware processor to provide a transform-tree-draw function accessible via the first API, the transform-tree-draw function generating a visual depiction of a transform tree of labels in the predetermined dataframe format.

11. The system of claim 1, wherein the instructions, when executed by the at least one hardware processor, further cause the at least one hardware processor to provide an annotation-transform function accessible via the first API, the annotation-transform function computing and presenting a transform of a ground-truth-label annotation of a dataframe in a local coordinate system of a specified target sensor.

12. The system of claim 1, wherein the instructions, when executed by the at least one hardware processor, further cause the at least one hardware processor to provide a plurality of functions accessible via the first API for auditing, changing, and merging labels in the input dataset.

13. At least one non-transitory computer-readable storage medium containing instructions that, when executed by at least one hardware processor of a system, cause the at least one hardware processor to perform operations to:
 receive, via a first application programming interface (API), an input-dataset selection identifying an input dataset, the input dataset comprising a plurality of dataframes that are in a first dataframe format and that have annotations corresponding to one or more sensing tasks performed with respect to the plurality of dataframes;
 execute a plurality of dataframe-transformation functions to convert the plurality of dataframes of the input dataset into a predetermined dataframe format;
 train an instance of a first machine-learning model using the converted plurality of dataframes of the input dataset to perform at least a subset of the one or more sensing tasks; and
 output, via the first API, one or more model-validation metrics pertaining to the training of the instance of the first machine-learning model.

14. The non-transitory computer-readable storage medium of claim 13, wherein:
 the input dataset comprises an automated-driving dataset; and
 the first machine-learning model comprises a sensing model for a sensing system of a vehicle.

15. The non-transitory computer-readable storage medium of claim 13, wherein the first API comprises a user interface.

16. The non-transitory computer-readable storage medium of claim 13, wherein the first API provides access to functions for receiving the input-dataset selection and for ingesting the input dataset.

17. The non-transitory computer-readable storage medium of claim 13, further comprising operating according to at least a second API, the second API providing access to the plurality of dataframe-transformation functions for converting the plurality of dataframes of the input dataset from the first dataframe format to the predetermined dataframe format.

18. The non-transitory computer-readable storage medium of claim 13, wherein:
 each dataframe is an ordered data structure comprising time-aligned multimodal sensor input; and
 the annotations comprise one or more ground-truth labels corresponding to the one or more sensing tasks performed with respect to the plurality of dataframes.

19. The non-transitory computer-readable storage medium of claim 18, wherein the at least a subset of the one or more sensing tasks corresponds to the one or more ground-truth labels as converted to the predetermined dataframe format.

20. The non-transitory computer-readable storage medium of claim 13, wherein the predetermined dataframe format is used by the system for one or more of testing, training, and validating instances of machine-learning models.

21. The non-transitory computer-readable storage medium of claim 13, wherein the instructions, when executed by the at least one hardware processor, further cause the at least one hardware processor to:
 receive, via the first API, a second input-dataset selection identifying a second input dataset, the second input dataset comprising a second plurality of dataframes that are in a second dataframe format and that have annotations corresponding to one or more sensing tasks performed with respect to the plurality of dataframes;
 execute a second plurality of dataset-transformation functions to convert the second plurality of dataframes of the second input dataset into the predetermined dataframe format;
 train the instance of the first machine-learning model using the converted second plurality of dataframes of the second input dataset to perform at least a subset of the one or more sensing tasks; and
 output, via the first API, the one or more model-validation metrics pertaining to the training of the instance of the first machine-learning model based also on the second input dataset.

22. The non-transitory computer-readable storage medium of claim 13, wherein the instructions, when executed by the at least one hardware processor, further cause the at least one hardware processor to provide a transform-tree-draw function accessible via the first API, the transform-tree-draw function generating a visual depiction of a transform tree of labels in the predetermined dataframe format.

23. The non-transitory computer-readable storage medium of claim 13, wherein the instructions, when executed by the at least one hardware processor, further cause the at least one hardware processor to provide an annotation-transform function accessible via the first API, the annotation-transform function computing and presenting a transform of a ground-truth-label annotation of a dataframe in a local coordinate system of a specified target sensor.

24. An apparatus comprising:
means for receiving, via a first application programming interface (API), an input-dataset selection identifying an input dataset, the input dataset comprising a plurality of dataframes that are in a first dataframe format and that have annotations corresponding to one or more sensing tasks performed with respect to the plurality of dataframes;
means for executing a plurality of dataframe-transformation functions to convert the plurality of dataframes of the input dataset into a predetermined dataframe format;
means for training an instance of a first machine-learning model using the converted plurality of dataframes of the input dataset to perform at least a subset of the one or more sensing tasks; and
means for outputting, via the first API, one or more model-validation metrics pertaining to the training of the instance of the first machine-learning model.

25. The apparatus of claim 24, wherein:
each dataframe of the plurality of dataframes is an ordered data structure comprising time-aligned multimodal sensor input; and
the annotations comprise one or more ground-truth labels corresponding to the one or more sensing tasks performed with respect to the plurality of dataframes.

* * * * *